United States Patent
Yamazaki

(10) Patent No.: US 10,521,171 B2
(45) Date of Patent: Dec. 31, 2019

(54) APPARATUS AND METHOD FOR MANAGING OBJECTS BETWEEN INFORMATION PROCESSING APPARATUSES

(71) Applicant: CANON KABUSHIKI KAISHA, Tokyo (JP)

(72) Inventor: Daisuke Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/194,133

(22) Filed: Nov. 16, 2018

(65) Prior Publication Data
US 2019/0155558 A1 May 23, 2019

(30) Foreign Application Priority Data
Nov. 20, 2017 (JP) .................. 2017-222397

(51) Int. Cl.
*G06F 3/12* (2006.01)
*G06F 9/455* (2018.01)
*H04N 1/00* (2006.01)

(52) U.S. Cl.
CPC .......... *G06F 3/1261* (2013.01); *G06F 3/1218* (2013.01); *G06F 3/1287* (2013.01); *G06F 9/45533* (2013.01); *H04N 1/00238* (2013.01); *H04N 1/00241* (2013.01)

(58) Field of Classification Search
None
See application file for complete search history.

(56) References Cited

U.S. PATENT DOCUMENTS

| 2009/0237728 A1* | 9/2009 | Yamamoto | G06F 3/1454 358/1.15 |
| 2009/0230253 A1 | 10/2009 | Canon | |
| 2012/0254898 A1* | 10/2012 | Nakata | G06F 9/4411 719/324 |

* cited by examiner

*Primary Examiner* — Andrew H Lam
(74) *Attorney, Agent, or Firm* — Canon U.S.A., Inc., IP Division

(57) ABSTRACT

An information processing apparatus capable of managing an object to which a print queue for instructing execution of processing on an image processing apparatus is allocated is configured to determine whether an image processing apparatus corresponding to a print queue allocated to an object managed by another information processing apparatus is identical with an image processing apparatus corresponding to a print queue registered in the information processing apparatus, and, in a case where it is determined that the image processing apparatuses are identical with each other, to make a setting for allocating the print queue registered in the information processing apparatus to an object to be displayed on the information processing apparatus.

9 Claims, 21 Drawing Sheets

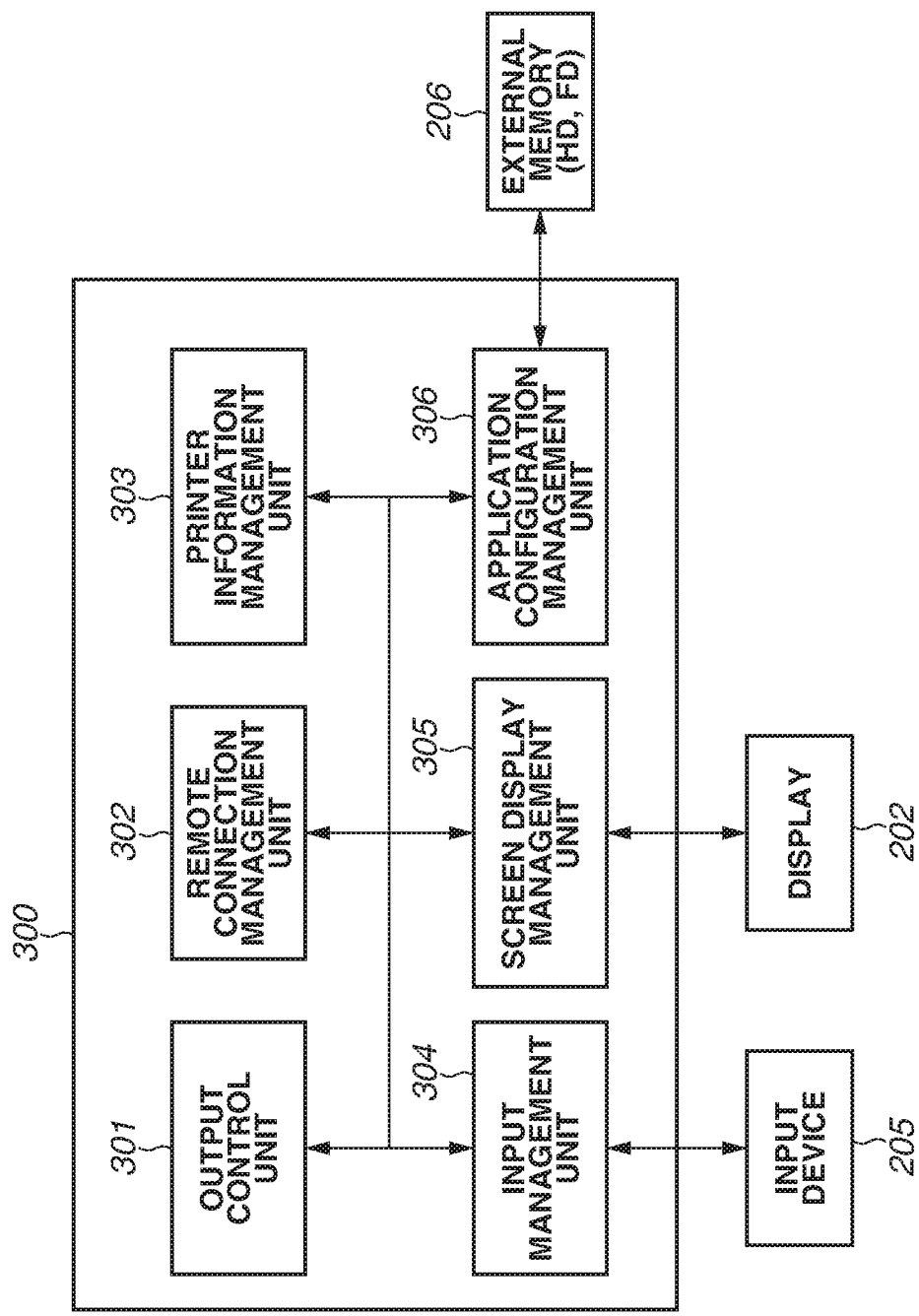

FIG.4A
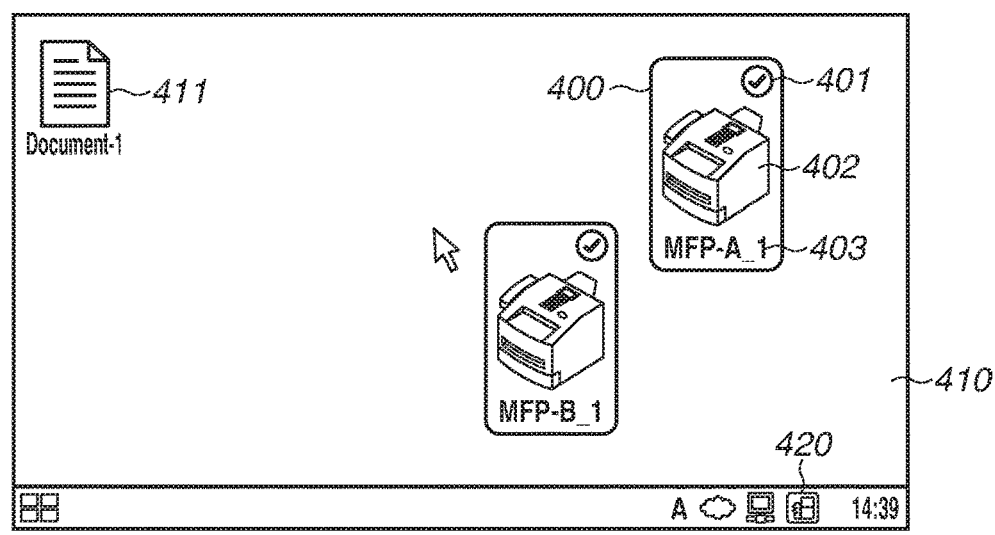
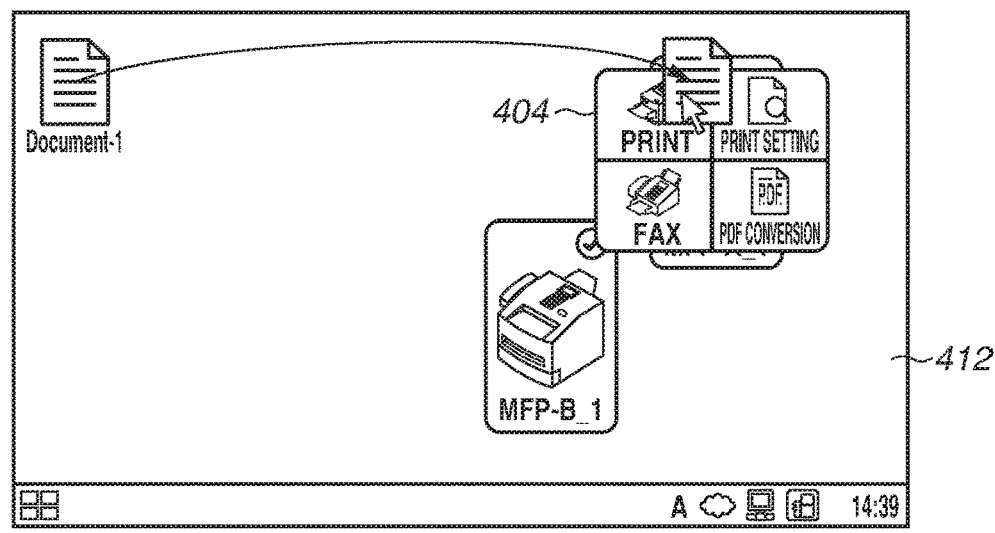
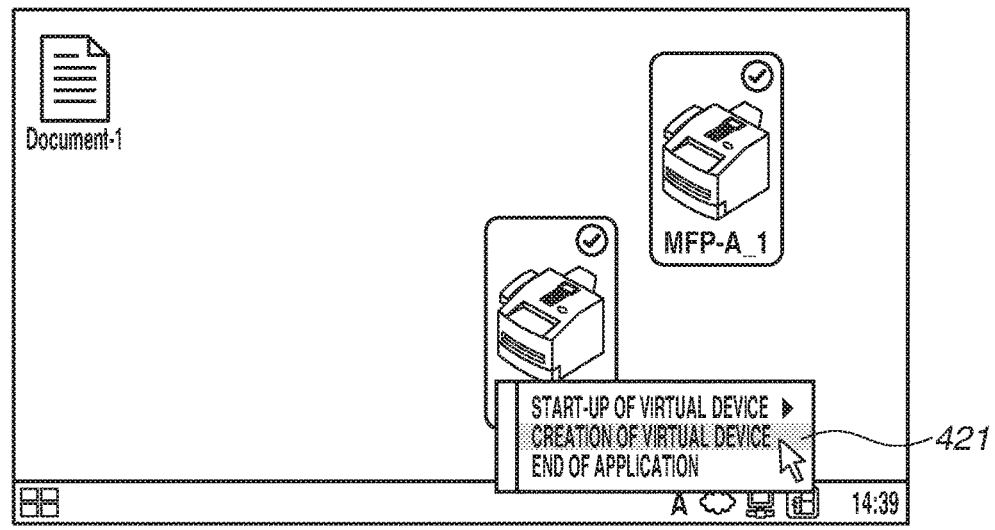

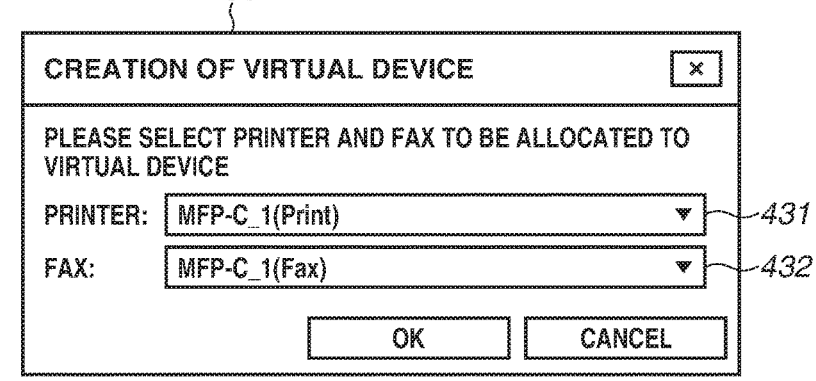

FIG.6

```
600
<?xml version="1.0" encoding="utf-8"?>
<DeviceObjectList>
    <DeviceObject>
        <Name>MFP-A_1</Name> ~603
        <PrinterName>MFP-A_1 (Print)</PrinterName> ~604
        <FaxName>MFP-A_1(Fax)</FaxName> ~605                    607
        <IPAddress>111.11.11.13</IPAddress> ~606
        <ImageFilePath>C:¥Users¥user1¥Images¥MFP-A.png</ImageFilePath>
        <DisplayDeviceStatus>True</DisplayDeviceStatus> ~608
        <MonitorJob>True</MonitorJob> ~609
        <PDFLocation>C:¥Users¥user1¥Desktop</PDFLocation> ~610
        <IsDisplay>True</IsDisplay> ~611
        <WindowTop>604</WindowTop> ~612
        <WindowLeft>1402</WindowLeft> ~613
        <IsRedirect>True</IsRedirect> ~614
        <RemoteHost>111.11.11.11 </RemoteHost> ~615
    </DeviceObject>

...

</DeviceObjectList>
```

601, 602, 602

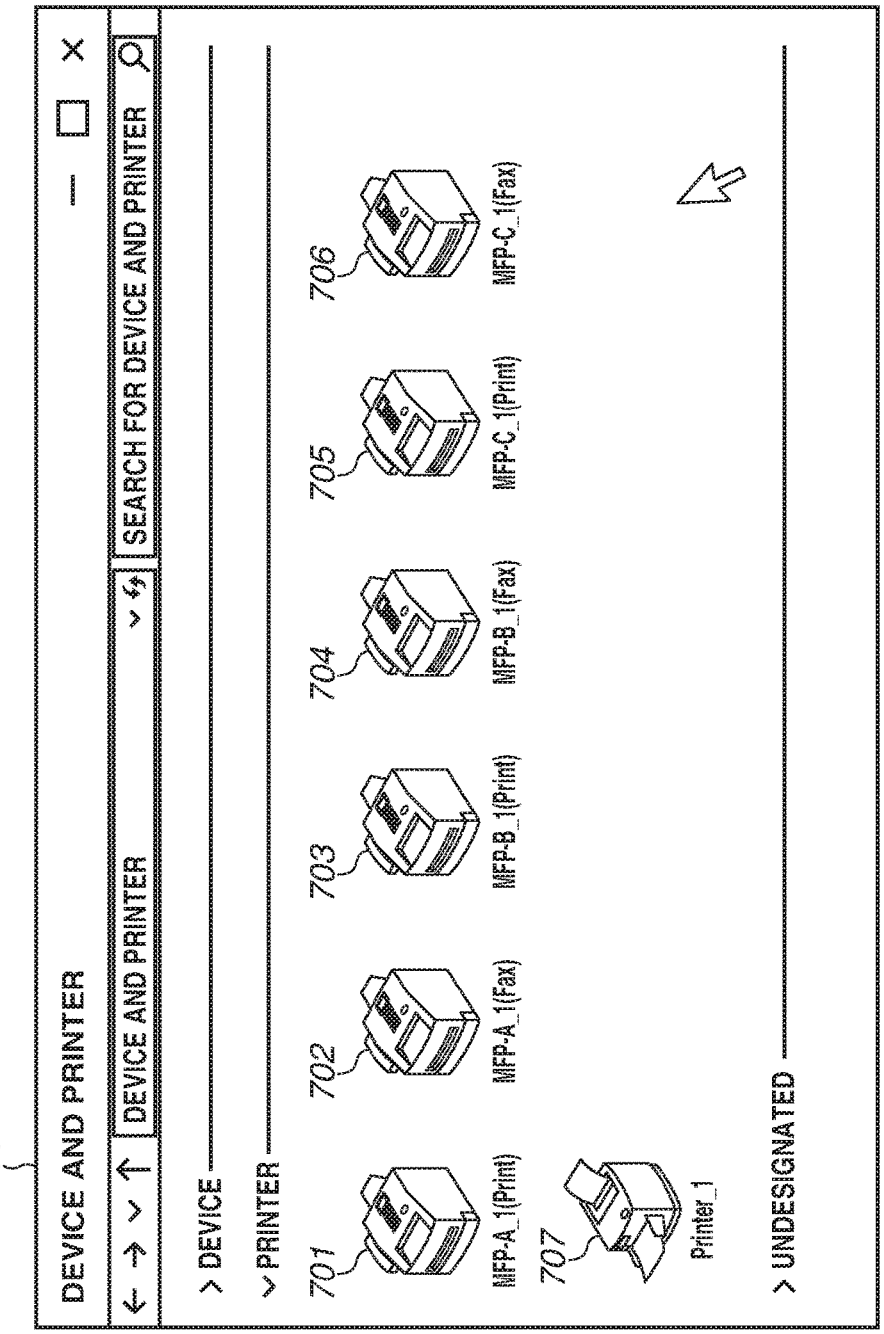

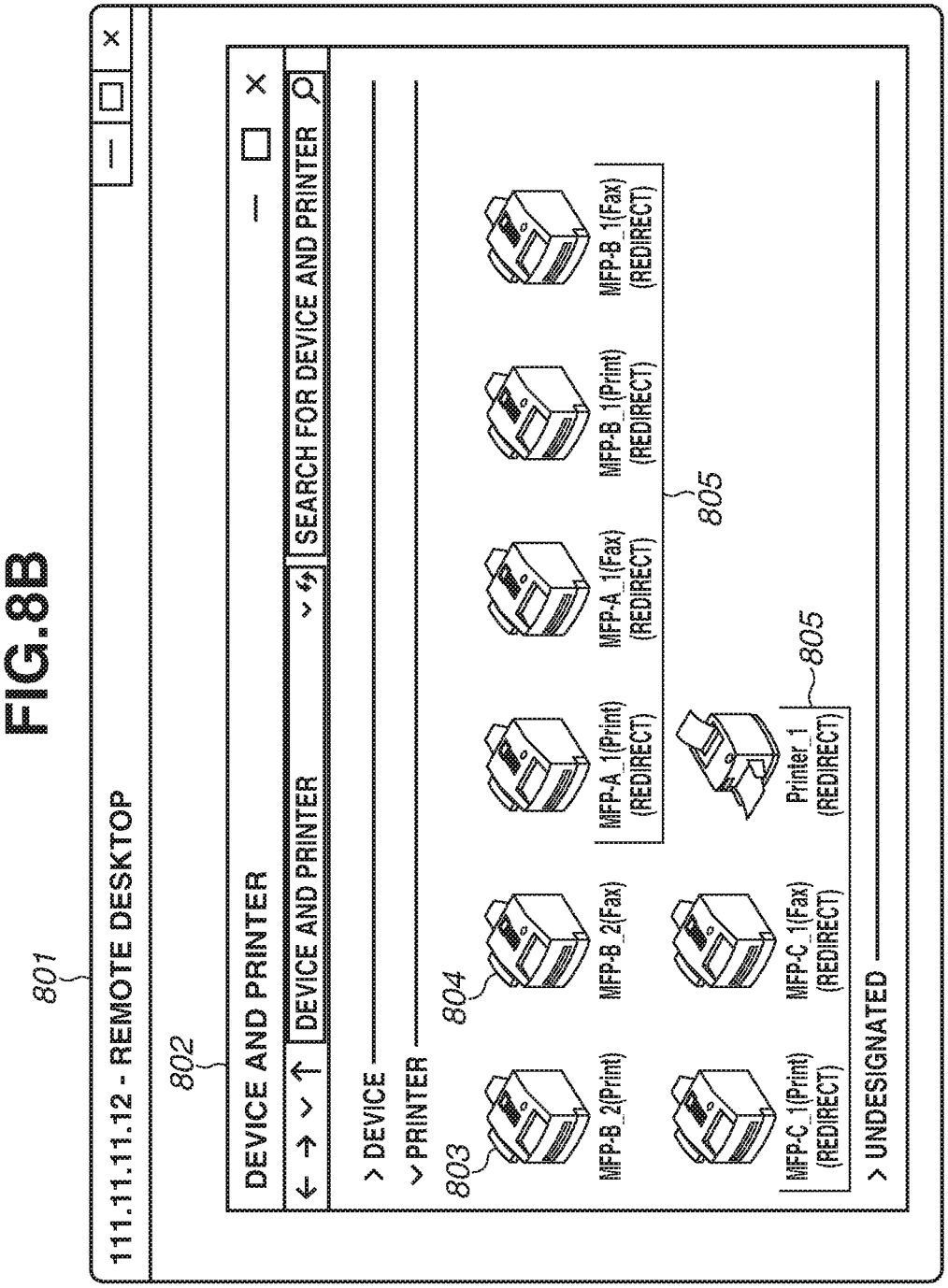

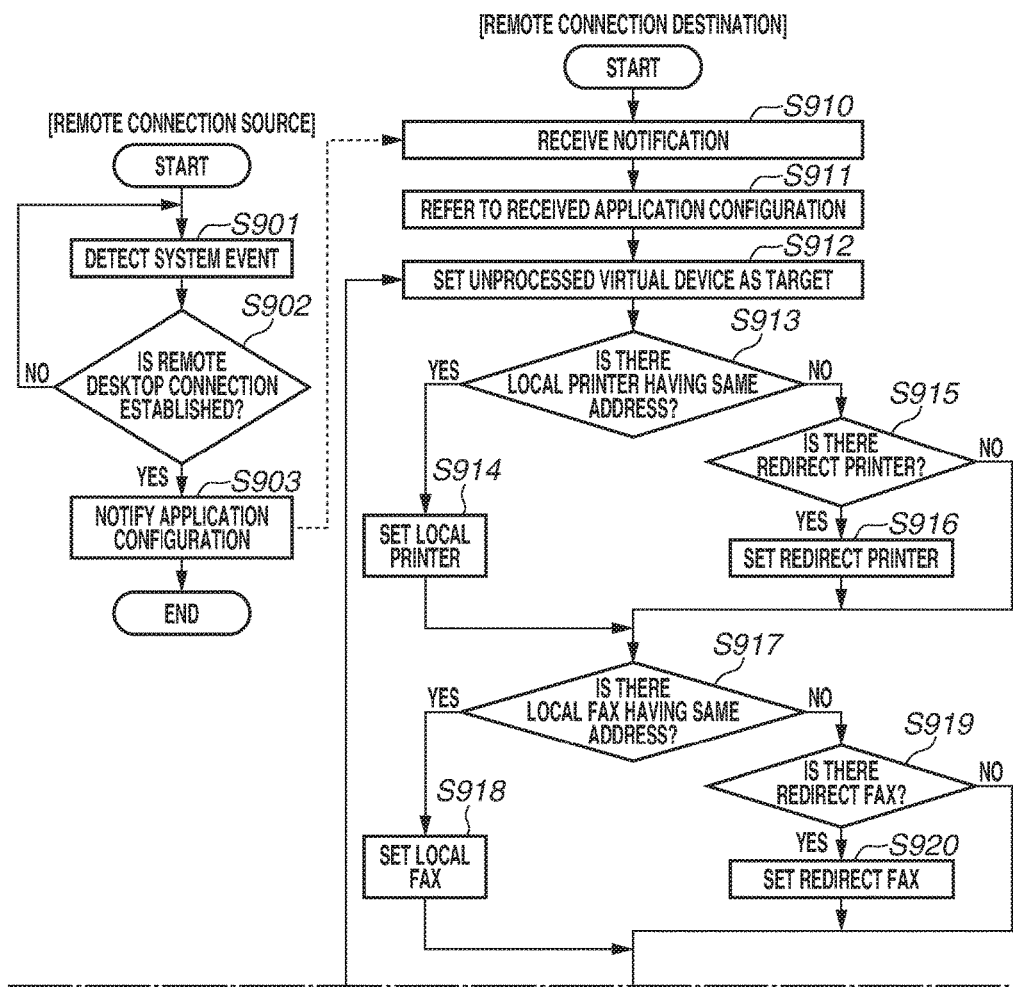

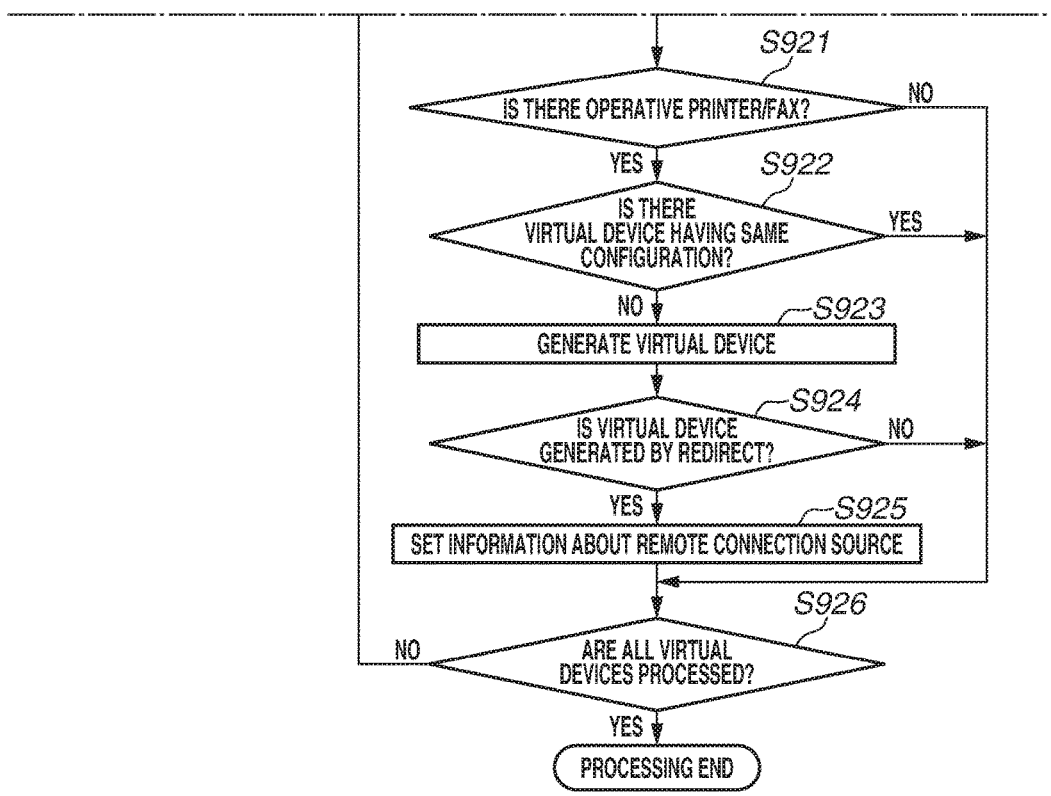

APPARATUS AND METHOD FOR MANAGING OBJECTS BETWEEN INFORMATION PROCESSING APPARATUSES

BACKGROUND

Field

The present disclosure relates to an information processing apparatus, a control method therefor, and a program which are capable of managing an object to which a print queue for instructing execution of processing on an image forming apparatus is allocated.

Description of the Related Art

With the recent widespread use of a network environment and development of virtualization technology, the number of utilization methods in which a terminal connected via a network operates and uses an operating system (OS) or application program of another terminal by remote connection has been increasing. As one of the techniques for implementing such a remote connection, a remote desktop provided by Microsoft Windows® is widely used. A remote desktop allows a user to operate a desktop environment of a terminal connected via a network by using his/her terminal at hand.

At the time of using a remote desktop, it is preferable that devices such as a printer and a facsimile (fax), which have been used in a remote connection source, can also be used in a remote connection destination. Accordingly, when a remote desktop is used, a printer or the like in the terminal of the remote connection source is copied to the remote connection destination as a redirect printer or the like. During a remote connection, the remote connection destination can issue a printing request to the redirect printer. The printing request is redirected to the printer of the remote connection source to execute the printing. The term "printer" refers to a logical print queue registered in the OS for instructing an output device, such as a multifunction peripheral (MFP), to execute the printing. Hereinafter, a logical print queue for executing printing may be referred to as a "printer", and a queue for executing fax transmission may be referred to as a "fax".

Japanese Patent Application Laid-Open No. 2009-230253 discusses a technique that facilitates printing using a remote connection technique. The technique discussed in Japanese Patent Application Laid-Open No. 2009-230253 implements printing easily by changing a default printer of an OS to a printer of an MFP in the case of establishing a remote connection from the MFP to a personal computer (PC) and operating the PC from the MFP to execute the printing.

SUMMARY

According to an aspect of the present disclosure, an information processing apparatus capable of managing an object to which a print queue for instructing execution of processing on an image processing apparatus is allocated includes a reception unit configured to receive configuration information about an object managed by another information processing apparatus different from the information processing apparatus in a case where a remote desktop connection is established which enables displaying, on a display unit of the another information processing apparatus, a window for displaying a desktop screen of the information processing apparatus, a determination unit configured to determine, based on the received configuration information, whether an image processing apparatus corresponding to a print queue allocated to the object managed by the another information processing apparatus is identical with an image processing apparatus corresponding to a print queue registered in the information processing apparatus, and a setting unit configured to make a setting for allocating the print queue registered in the information processing apparatus to an object to be displayed on the information processing apparatus in a case where the determination unit determines that the image processing apparatuses are identical with each other. The object for which the setting is made is displayed to instruct execution of processing on the image processing apparatus corresponding to the print queue, by using the print queue.

Further features will become apparent from the following description of exemplary embodiments with reference to the attached drawings.

BRIEF DESCRIPTION OF THE DRAWINGS

FIG. 3 illustrates a software configuration of a virtual device application.
FIG. 4A illustrates a user interface (UI) of the virtual device application.
FIG. 4B illustrates an UI of the virtual device application.
FIG. 6 illustrates a data structure of a setting file for the virtual device application.
FIG. 7 illustrates an example of a printer list screen.
FIG. 8A and FIG. 8B illustrate desktop screens for displaying a remote connection state.
FIG. 9A and FIG. 9B illustrate flowcharts for generating a virtual device.

DESCRIPTION OF THE EMBODIMENTS

Figure 1:
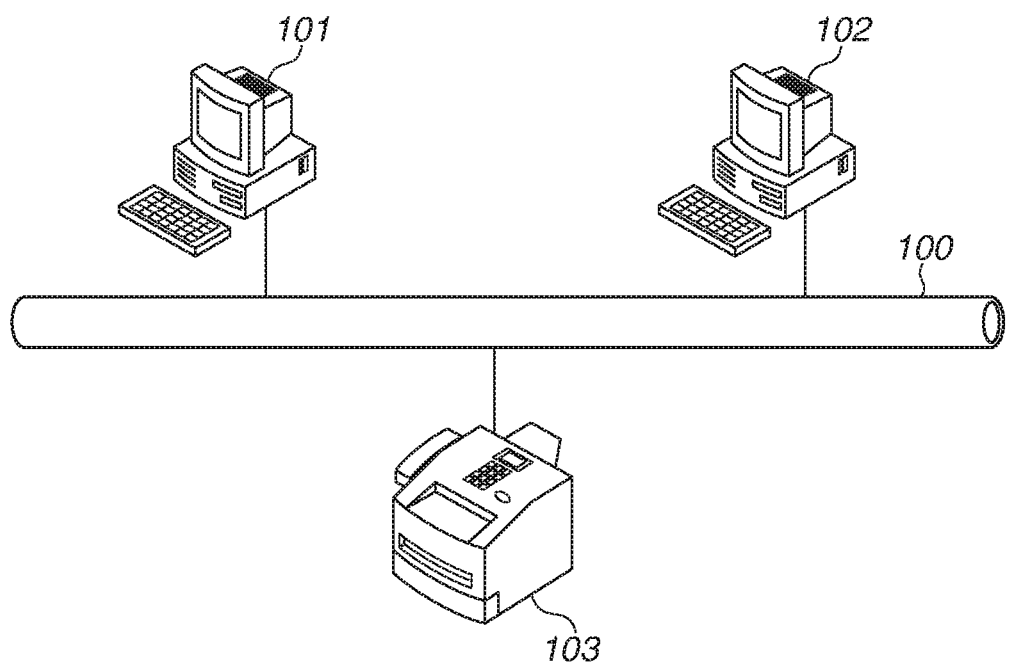
FIG. 1 illustrates a system configuration.

In a case where an application is used in a remote connection, the user-friendliness can be improved by enabling use of an application configuration of a remote connection source also in a remote connection destination. For example, the application is configured in such a manner that a printer and a facsimile (fax) are allocated to the application, and the application instructs execution of printing using the allocated printer, or instructs execution of fax transmission using the allocated fax, based on a user operation.

However, in the technique for a remote connection from a multifunction peripheral (MFP) to a personal computer (PC) as discussed in Japanese Patent Application Laid-Open No. 2009-230253, the above-described redirect printer is not taken into consideration. Accordingly, the technique, described in Japanese Patent Application Laid-Open No. 2009-230253 is based on the premise that a printer for outputting data to the MFP is preliminarily installed on the PC and a setting for switching to the printer is made. As described above, the printer of the remote connection source is restored in the remote connection destination as the redirect printer on the desktop of the remote connection destination.

If a virtual device having the same configuration (MFP) as that of the remote connection source is to be used in the remote connection destination, a printer or a fax allocated as a virtual device of the remote connection source may also be allocated to the remote connection destination as a redirect printer or a redirect fax.

However, even in a case where the printer or the like in which the MFP is set as an output destination is registered in the remote connection destination, if a printer (local printer) is included in the remote connection destination, the printer is preferably used. This is because the amount of information that can be referenced by a redirect printer or a redirect fax is generally smaller than the amount of information that can be referenced by a local printer or a local fax (for example, an IP address of an MFP cannot be resolved) during processing of a program. Thus, the functions of a redirect printer or a redirect fax may be more limited than the functions of a local printer or a local fax.

In a case where the virtual devices as described above are also used in the remote connection destination having the same configuration as that of the remote connection source, there is a need to take a redirect printer, a local printer, and the like into consideration, and thus it is difficult for a user who has no knowledge about the redirect printer, the local printer, and the like, to select the printers.

The present disclosure has been made in view of the above-described problems. The present disclosure is directed to providing a user-friendly unit when a printer or fax is used at a remote connection destination in a remote connection environment.

According to the present disclosure, the user can easily use a printer or fax at a remote connection destination in a remote connection environment.

Exemplary embodiments of the present disclosure will be described below with reference to the drawings. The exemplary embodiments are not intended to limit the present disclosure, and not all the configurations described in the exemplary embodiments are essential to solution of the problems of the present disclosure.

A first exemplary embodiment will be described. FIG. 1 illustrates an example of the overall configuration of a system. A PC 101, a PC 102, and a multifunction peripheral (MFP) 103 are communicably connected to each other on a local area network (LAN) 100. While the present exemplary embodiment illustrates an example where two computers are connected, three or more computers may be connected.

The PC 101 and the PC 102 are an example of an information processing apparatus, and a predetermined operating system (OS) is installed on each of the PC 101 and the PC 102. Further, various applications for executing specific functional processing may be installed on the PC 101 and the PC 102. The specific functional processing described herein includes document processing, spreadsheet processing, presentation processing, image processing, and graphic processing, and each application includes its individual data structure (file structure). These are merely exemplary and other applications that provide specific functional processing may be installed.

Further, an application 300 for generating a virtual device for executing printing or fax transmission to the MFP is installed on the PC 101 and the PC 102. The present exemplary embodiment illustrates a case where a virtual device having the same configuration as that of the virtual device used in the PC 101 can be used in the PC 102 when a remote operation is performed in a case where the PC 101 is set as the remote connection source and the PC 102 is set as the remote connection destination. The remote connection described herein refers to a remote desktop connection capable of displaying a window for displaying a desktop screen of the PC 102 on a display unit of the PC 101.

The MFP 103 is a multifunction peripheral which is an example of the image processing apparatus, and includes a print function, a fax function, a copy function, a scanner function, and a file transmission function. Printing or fax transmission is executed according to an instruction from the PC 101 or the PC 102. A plurality of MFPs 103 may be provided.

Figure 2:
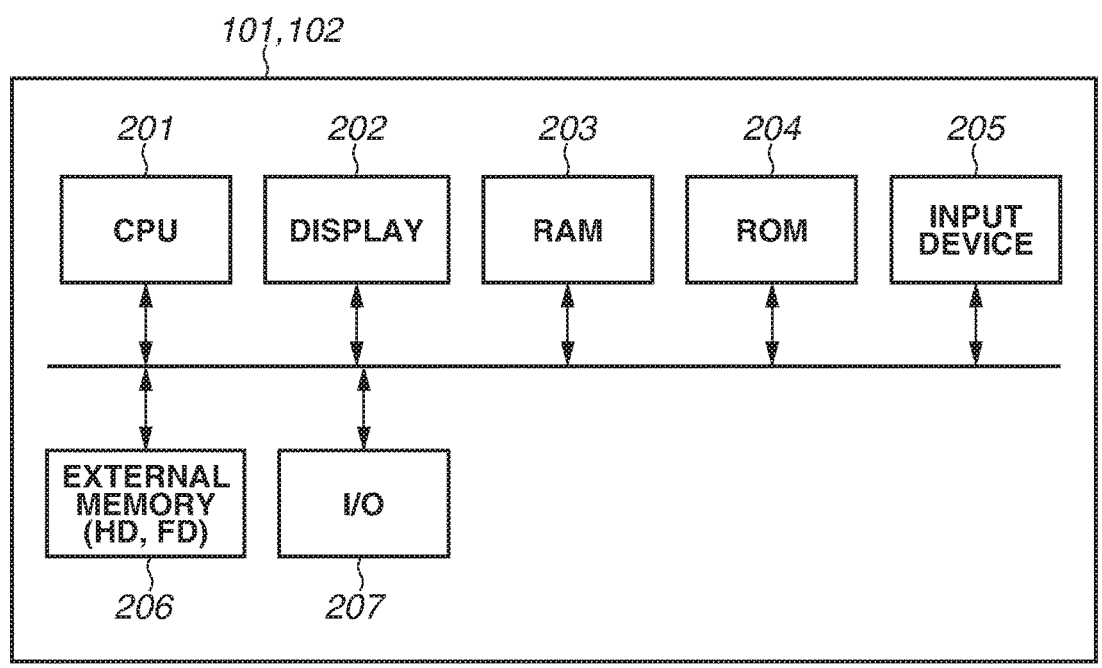
FIG. 2 illustrates a hardware configuration of each personal computer (PC).

FIG. 2 illustrates an example of a hardware configuration of the PC 101 and the PC 102.

A central processing unit (CPU) 201 executes various programs. A display 202 provides the user with a visual output information feedback. A random access memory (RAM) 203 and a read only memory (ROM) 204 are storage devices that store various programs and execution information. An input device 205 includes a keyboard and a pointing device, and receives a user operation input. An external memory 206 includes a hard disk drive (HDD) and a floppy disk drive (FDD). An interface device I/O 207 communicates with an external apparatus.

The PC 101 and the PC 102 communicate with each other via the interface device I/O 207, and also communicate with the MFP 103.

Processing described in the present exemplary embodiment is implemented by causing the CPU 201 to load a program stored in the ROM 204 or the external memory 206 into the RAM 203 and execute the program.

FIG. 3 illustrates an example of a software configuration of the virtual device application 300 to be executed by the PC 101 and the PC 102.

The virtual device application 300 is an application for generating a virtual device in the remote connection source PC 101 or the remote connection destination PC 102. The virtual device application 300 is installed on the PC 101 and the PC 102, and the program is stored in the ROM 204 or the external memory 206 of the PC 101 and the PC 102. In other words, the CPU 201 loads the program into the RAM 203 and executes the program, thereby implementing the function of the virtual device application 300 and processing according to a flowchart to be described below.

The virtual device application 300 includes an output control unit 301, a remote connection management unit 302, a printer information management unit 303, an input management unit 304, a screen display management unit 305, and an application configuration management unit 306.

The output control unit 301 executes various output processing, such as printing, fax transmission, and conversion and storage of documents, according to an output operation by the user. For example, upon reception of a printing or fax instruction, the output control unit 301 transmits a job to the MFP 103 through an allocated printer or fax. Upon reception of an instruction for converting a document, the output control unit 301 converts any file into a file of a format such as a portable document format (PDF).

The remote connection management unit 302 monitors a system event in the OS and detects a remote connection. Further, the remote connection management unit 302 executes communication processing between the remote connection source and the remote connection destination during the remote connection.

The printer information management unit 303 acquires information about the printer or fax registered in the OS. The term "printer" refers to a logical print queue registered in the OS which instructs an output device, such as the MFP, to execute printing. Hereinafter, a logical print queue for executing printing is referred to as a "printer", and a queue for executing fax transmission is referred to as a "fax".

The input management unit 304 detects an operation on the input device 205 by the user via a graphical user interface (GUI) of the virtual device application 300 displayed by the screen display management unit 305, and acquires user operation information.

The screen display management unit 305 executes processing for screen display control, such as display of the GUI of the virtual device application 300, and reception of a user operation on the GUI.

The application configuration management unit 306 can manage the setting and status of an application during start-up of the virtual device application 300, and performs read/write processing on a setting file in the external memory 206. A specific example of the setting file will be described below.

FIGS. 4A and 4B illustrate an example of a GUI screen displayed when the virtual device application 300 is executed in the remote connection source PC 101.

A main user interface (UI) 400 of the virtual device application 300 is illustrated in an example (1) of FIG. 4A. The main UI 400 resides on a desktop 410 of the remote connection source PC 101, receives a file drag-and-drop operation, and executes various output processing according to the operation. When the main UI 400 is not used, the main UI 400 can be closed. When the main UI 400 is reopened, the main UI 400 can be opened from a menu of a task tray icon 420 of the virtual device application 300.

While the virtual device application 300 is running as a resident program during start-up of the OS of the PC 101, the virtual device application 300 is displayed as the task tray icon 420 on a task tray.

The main UI 400 includes a status icon 401, an image 402, and a name 403. The status icon 401 is an icon indicating the status of the MFP 103 and displays a device status, such as a printable status, a warning status, or an error status, according to the status of the MFP 103. The image 402 indicates the MFP 103, and the name 403 is a name indicating the MFP 103. The image 402 and the name 403 can be arbitrarily changed by the user using setting UIs 434 and 437 illustrated in an example (2) of FIG. 4B. A file 411 indicates a document file placed on the desktop 410.

The example (1) of FIG. 4A illustrates a state where virtual devices to which "MFP-A_1" and "MFP-B_1" are respectively allocated as the MFP 103 capable of instructing execution of printing or fax transmission are displayed on the desktop.

An example (2) of FIG. 4A illustrates the file 411 which is dragged onto the main UI 400. An output menu 404 includes "print" for executing printing, "print setting" for setting printing after opening a printing preview UI (not illustrated), "fax transmission" for executing fax transmission, and "PDF conversion" for converting a file into a PDF. A file is dropped to an output desired by the user, thereby allowing the virtual device application 300 to execute outputting.

In the case of creating a virtual device, as illustrated in an example (3) of FIG. 4A, the user selects creation of a virtual device 421 from the menu of the task tray icon 420. When creation of the virtual device 421 is selected, a virtual device creation screen 430 illustrated in FIG. 4B is displayed.

In an example (1) of FIG. 4B, when the user selects a printer 431 which is allocated to the virtual device on the virtual device creation screen 430, a list of printers registered in the OS is displayed on the combo box 431. Similarly, when the user selects a fax 432 which is allocated to the virtual device on the virtual device creation screen 430, a list of faxes registered in the OS is displayed on the combo box 432. In FIG. 4B, a printer and a fax are allocated to the PC 103 (not illustrated), and thus the user selects the PC 103 "MFP-C_1_(Print)" on the combo box 431 and selects the PC 103 "MFP_C_1(Fax)" on the combo box 432.

After the user selects a printer and a fax on the virtual device creation screen 430, when an OK button on the screen is executed, a virtual device setting screen 433 is displayed as illustrated in the example (2) of FIG. 4B. The virtual device setting screen 433 includes a virtual device name 434, the printer 435 and the fax 436 to be allocated, a file path 437 for the image 402 on the main UI 400 of the virtual device, a device status monitoring setting 438, a job monitoring setting 439, and a PDF conversion storage destination path 440. The user makes the settings and pushes the OK button on the virtual device setting screen 433, thereby generating a virtual device and the main UI 400 is displayed on the desktop of the OS.

Figure 5:
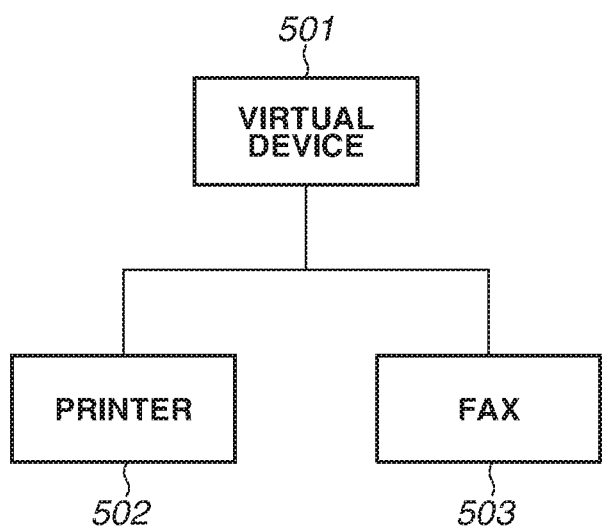
FIG. 5 schematically illustrates a configuration of a virtual device.

FIG. 5 schematically illustrates an example of the configuration of a virtual device in the virtual device application 300.

A virtual device 501 is configured in such a manner that a printer 502 for executing the printing corresponding to the specific MFP 103 and a fax 503 for executing the fax transmission are allocated to the virtual device 501. In this case, the printer 502 indicates a logical print queue for instructing execution of printing processing on the specific MFP 103, and the fax 103 indicates a logical print queue for instructing execution of fax transmission processing on the specific MFP 103. When a printing instruction is received from the user, the output is executed via the printer 502. When a fax transmission instruction is received from the user, the outputting is executed via the fax 503.

FIG. 6 illustrates an example of a data structure of a setting file for the virtual device application 300.

Setting information about the virtual device application 300 is stored in the external memory 206 as a setting file, so that the same setting as the previous setting can be used at the next start-up of the virtual device application 300. FIG. 6 illustrates an example where a setting file is stored in an Extensible Markup Language (XML) format as an example of the storage format. However, the storage format is not particularly limited to the XML format, but instead a general text format may be used. Data illustrated in FIG. 6 is passed between the virtual device applications 300 running on the PC 101 and those running on the PC 102, and is used to determine whether to generate a virtual device or is used to generate a virtual device in the processing to be described below.

A setting file 600 for the virtual device application 300 is configured to include a plurality of definitions for a virtual device 602 indicating configuration information about one virtual device as illustrated in a virtual device list 601.

The virtual device 602 is defined by the following configuration.

A name 603 is a name for identifying a virtual device and is designated by the user.

A printer 604 represents a name of a printer for executing printing on the MFP 103.

A fax 605 represents a name of a fax for executing fax transmission on the MFP 103.

An address 606 represents an IP address of the MFP 103.

An image file path 607 represents image file path information for identifying a virtual device, and an image for the image file path 607 can be changed to the one desired by the user.

A device status display setting 608 represents a setting indicating whether to display a device status on the main UI 400. When the setting value indicates "true", the status of the MFP 103 is acquired and an icon indicating the status is displayed on the status icon 402 of the main UI 400. When the setting value indicates "false", the status icon 402 is not displayed.

A job monitoring setting 609 represents a setting indicating whether to monitor a job. When the setting value indicates "true", the process of the printing job or fax transmission job being executed is monitored, and when the process is completed in the MFP 103, a notification is displayed on the main UI 400.

A PDF storage destination path 610 represents path information about a storage destination where a PDF file obtained at the time of executing a PDF conversion is stored.

A display setting 611 represents a setting value indicating whether to display the main UI 400 on the desktop of the OS. When the setting value indicates "true", the main UI 400 is displayed.

Positions 612 and 613 of the main UI 400 represent setting values each indicating a display position of the main UI 400, and determine coordinate positions on the desktop according to the setting values (top and left). By holding the setting values, at the next start-up, the main UI 400 is displayed at a position where the main UI 400 is previously used.

A redirect setting 614 shows whether a print queue is configured as a redirect queue.

A remote connection source 615 represents information, such as an IP address, for identifying the remote connection source during remote connection.

FIG. 7 illustrates an example of a printer list screen.

A printer list screen 700 of the OS displays printers registered in the OS. When a driver program (not illustrated) for a printer or fax is installed on the OS, the printer or fax is registered as a logical print queue (printer or fax) to be output to an external output device, such as the MFP 103, by using the driver program.

FIG. 7 illustrates a state where printers 701 to 707 are registered. "MFP-A_1(Print)" 701 represents a printer for the MFP 103 registered in the PC 101. "MFP-A_1(Fax)" 702 represents a fax for the MFP 103 registered in the PC 101. "MFP-B_1(Print)" 703 and the "MFP-B_1(Fax)" 704 represent a printer and a fax, respectively, for the MFP 103 registered in the PC 102. Similarly, "MFP-C_1(Print)" 705 and "MFP-C_1(Fax)" 706 represent a printer and a fax, respectively, for the MFP 103 registered in the PC 103 (not illustrated). "Printer_1" 707 represents a printer apparatus (not illustrated).

Figure 8A:
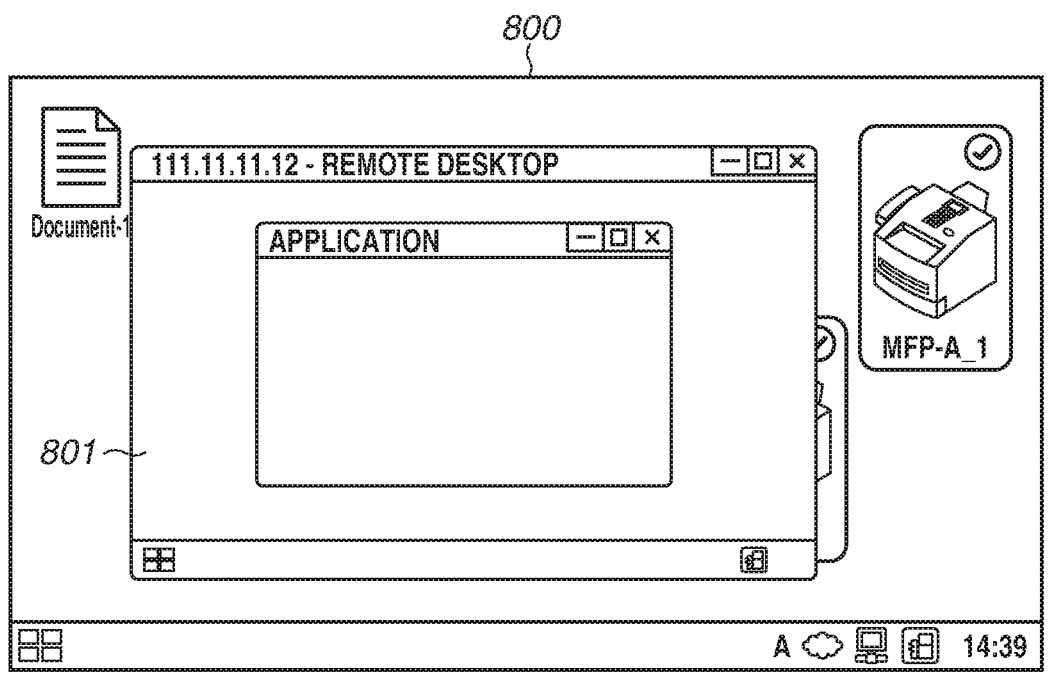

FIGS. 8A and 8B illustrate an example of a desktop screen indicating a remote connection state when the PC 102 is remotely connected using the PC 101 as the remote connection source.

A desktop screen 800 is a desktop screen of the remote connection source PC 101, and a desktop screen 801 is a desktop screen of the remote connection destination PC 102. A printer list screen 802 is displayed on the desktop screen 801 of the remote connection destination.

On the printer list screen 802, a local printer 803 and a local fax 804, and redirect queue printers/faxes 805 coexist. Drivers are installed and registered in the PC 102 for the local printer 803 and the local fax 804. The redirect queue printers/faxes 805 are obtained by copying printers registered in the PC 101 and are registered in the PC 102 through the remote connection.

As the local printer 803, "MFP-B_2(Print)" is displayed as a printer registered in the PC 102. As the local fax 804, "MFP-B_2(Fax)" is displayed as a fax registered in the PC 102.

A name with a character string "redirect" is given to each of the redirect printers/faxes 805 when printers and faxes registered in the PC 101 are copied and registered in the PC 102.

FIG. 8 described above illustrates an example of the desktop screen when the PC 102 is remotely connected using the PC 101 as the remote connection source. In this case, no virtual device is generated on the desktop screen 801 of the remote connection destination PC 102, and thus the main UI 400 is not displayed.

Accordingly, it is preferable that virtual devices, which have been used in the remote connection source, can also be used on the remote desktop screen 801 of the remote connection destination PC 102. To achieve this configuration, it is necessary to display the virtual device creation screen 430 on the desktop screen 801 of the remote connection destination PC 102 and to select a redirect printer or a redirect fax which can be used as a virtual device for the PC 101.

However, since "MFP-B_2" described above is registered as a local printer for the PC 102, in the case of performing printing processing from the PC 102, the local printer "MFP-B_2" is preferably selected instead of a redirect printer. This is because the functions of the local printer are less limited compared with the functions of the redirect printer.

However, for example, when the redirect printer is unknown or is not recognized by a user, or when the redirect printer is intentionally selected, it is difficult for a general user to estimate the status and select an appropriate printer. Accordingly, in the remote connection, it is preferable that the virtual devices, which have been used in the remote connection source PC 101, may be automatically generated in the remote connection destination PC 102.

FIG. 9 illustrates an example of a flowchart for processing in which the virtual device that is the same as the virtual device used in the remote connection source PC 101 during remote connection is automatically created in the remote connection destination PC 102.

Steps S901 to S903 indicate processing in the remote connection source PC 101, and steps S910 to S926 indicate processing in the remote connection destination PC 102.

The virtual device application 300 of the remote connection source PC 101 resides and monitors a system event in the OS while the OS of the PC 101 is running Specifically, in step S901, the remote connection management unit 302 monitors a system event and detects the system event generated in the OS.

In step S902, the remote connection management unit 302 refers to event information upon detecting the system event, and determines whether the system event indicates a remote connection.

If it is determined that the system event indicates a remote connection (YES in step S902), the processing proceeds to step S903 and the remote connection management unit 302 refers to the configuration information about the virtual device held in the application configuration management unit 306 and notifies the remote connection destination PC 102 of the information.

If it is not determined that the system event indicates a remote connection in step S902 (NO in step S902), the processing is terminated and the remote connection source PC 101 returns to the system event monitoring state.

The notification to the remote connection destination in step S903 is implemented by, for example, communication between the remote connection source PC 101 and the remote connection destination PC 102 by Transmission Control Protocol (TCP)/Internet Protocol (IP). The remote connection destination monitors a port for communication between the remote connection source and the remote connection destination, and waits for a connection request from the remote connection source. When a notification is issued from the remote connection source, the port is designated and a connection request is sent to establish the connection with the remote connection destination. The notification is implemented by communication using a command or data in accordance with a definition of an interface that can be interpreted by the remote connection source and the remote connection destination. These processes are performed by the remote connection management unit 302. The notification may be executed by another method capable of transmitting and receiving information between the remote connection source and the remote connection destination. For example, a means that uses a clipboard area of the OS, or a shared file that can be referenced by the remote connection source and the remote connection destination may be prepared.

In step S910, the remote connection destination PC 102 receives the notification from the remote connection source PC 101. Specifically, the remote connection management unit 302 of the virtual device application 300 running on the remote connection destination PC 102 waits for a notification from the remote connection source PC 101, and receives the notification sent from the remote connection source PC 101. Information to be notified in the case indicates the configuration information about the virtual device. FIG. 6 illustrates the information indicating the data structure of the setting file for the virtual device application 300.

In step S911, the remote connection management unit 302 refers to the received notification information and delivers the notification information to the application configuration management unit 306.

In step S912, the application configuration management unit 306 refers to the received configuration information about the virtual device managed by the connection source PC 101, and one of the definitions for the virtual device included in the configuration information about the virtual device is set as a target for the following processing.

In step S913, the application configuration management unit 306 refers to the address 606 in the configuration information about the virtual device, and sends an instruction to the printer information management unit 303 to determine whether the local printer having the address that matches the address 606 is registered in the remote connection destination PC 102.

If it is determined that the local printer is registered (YES in step S913), the processing proceeds to step S914 to make a setting for allocating the local printer as a printer for the virtual device.

If it is determined that the local printer having the address that matches the address 606 is not present in step S913 (NO in step S913), the processing proceeds to step S915. In step S915, the application configuration management unit 306 sends an instruction to the printer information management unit 303 to confirm whether there is a printer which is registered as a redirect printer in the PC 102 and which is the printer 604 included in the configuration information about the virtual device. The determination is made based on whether a printer having a name with a character string "redirect", which is preliminarily defined as the name of the printer, is present, by using the name of the printer 604 included in the configuration information about the virtual device. In a case where a character string including a variable value, such as "redirect 1" or "redirect 2", is given, the determination may be made using a regular expression in which such values are taken into consideration.

If the redirect printer is present in step S915 (YES in step S915), the process proceeds to step S916 and the application configuration management unit 306 makes a setting for allocating the redirect printer as a printer for the virtual device.

Next, in step S917, the application configuration management unit 306 selects a fax. Similar to step S913, it is determined whether the local fax having the address that matches the address 606 included in the configuration information about the virtual device is present.

If it is determined that the local fax is present in step S917 (YES in step S917), the processing proceeds to step S918 and the application configuration management unit 306 makes a setting for allocating the local fax as a fax for the virtual device.

If the local fax having the address that matches the address 606 is not present in step S917 (NO in step S917), the processing proceeds to step S919.

In step S919, the application configuration management unit 306 sends an instruction to the printer information management unit 303, similar to step S915, to confirm whether there is a fax which is allocated to the PC 102 as a redirect fax, and which is the printer 604 included in the configuration information about the virtual device.

If the redirect fax is present (YES in step S919), the processing proceeds to step S920 and the application configuration management unit 306 makes a setting for allocating the redirect fax as a fax for the virtual device.

Next, in step S921, the application configuration management unit 306 refers to the result of the processing described above and checks the printer and fax to be allocated to the virtual device. In this case, if one or both of the printer and fax to be allocated are present (YES in step S921), the processing proceeds to step S922. If the printer and fax to be allocated are not present (NO in step S921), the processing proceeds to step S926 without creating any virtual device.

In step S922, the application configuration management unit 306 refers to the configuration information about the virtual device application that runs on the remote connection destination PC 102 that is held in the application configuration management unit 306, and confirms whether the virtual device that is identical to the virtual device to be generated in the processing described above is already generated. Specifically, it is confirmed whether there is a virtual device to which the same printer or fax is allocated.

If it is determined that there is no virtual device to which the same printer or fax is allocated (NO in step S922), the processing proceeds to step S923. If there is already a virtual device to which the same printer or fax is allocated (YES in step S922), the processing proceeds to step S926 without creating any virtual device.

In step S923, the application configuration management unit 306 generates a definition for the virtual device with the configuration of the allocated printer and fax. In the definition for the virtual device, the setting information other than the information about the printer and fax reflects values defined in the configuration information about the virtual device received by the notification from the remote connection source PC 101. As a result, the virtual device equivalent to the virtual device which has been used in the remote connection source PC 101 can be generated in the remote connection destination PC 102.

If one of the allocated printer and fax is configured as a local printer or fax and the other of the allocated printer and fax is configured as a redirect printer or fax, a definition is generated assuming that a local printer or fax and a redirect printer or fax are allocated to different virtual devices, respectively. Such a configuration can be considered as a single virtual device to which a local printer or fax and a redirect printer or fax are allocated.

Next, in step S924, the application configuration management unit 306 determines whether a redirect printer or a redirect fax is allocated to the generated virtual device. Specifically, if a redirect printer or a redirect fax is allocated to the generated virtual device in steps S916 and S920, flag information indicating a redirect printer or fax is set and a determination is made with reference to the flag.

If it is determined that the virtual device is generated by allocating a redirect printer or a redirect fax in step S924 (YES in step S924), the processing proceeds to step S925 and the application configuration management unit 306 sets information about the remote connection source, and then the processing proceeds to step S926. Specifically, the information about the remote connection source corresponds to the information 615 such as the IP address of the connection source, for identifying the remote connection source PC 101. The application configuration management unit 306 holds the information.

Next, in step S926, the application configuration management unit 306 refers to the configuration information about the virtual device of the connection source that is received in step S910, and determines whether all virtual devices are processed. If an unprocessed virtual device is present (NO in step S926), the processing returns to step S912 to execute the above-described processing on the unprocessed virtual device.

If all virtual devices are processed (YES in step S926), the processing illustrated in the flowchart of FIG. 9 is terminated.

While the present exemplary embodiment illustrates an example where a system event is detected at the remote connection source, a system event may be detected by the remote connection destination. In this case, a remote connection is detected at the remote connection destination, and a notification indicating that the remote connection is detected is sent to the remote connection source. The remote connection source which has received the notification notifies the remote connection destination of the configuration of the application in step S903.

By the processing described above, the virtual device having the same configuration as that of the virtual device which has been used in the remote connection source during remote connection can be generated in the remote connection destination. Thus, since the virtual device is used in the remote connection destination, the virtual device application 300 can be easily used without requiring the user to select a printer or a fax in consideration of a redirect printer or a local printer.

Figure 10:
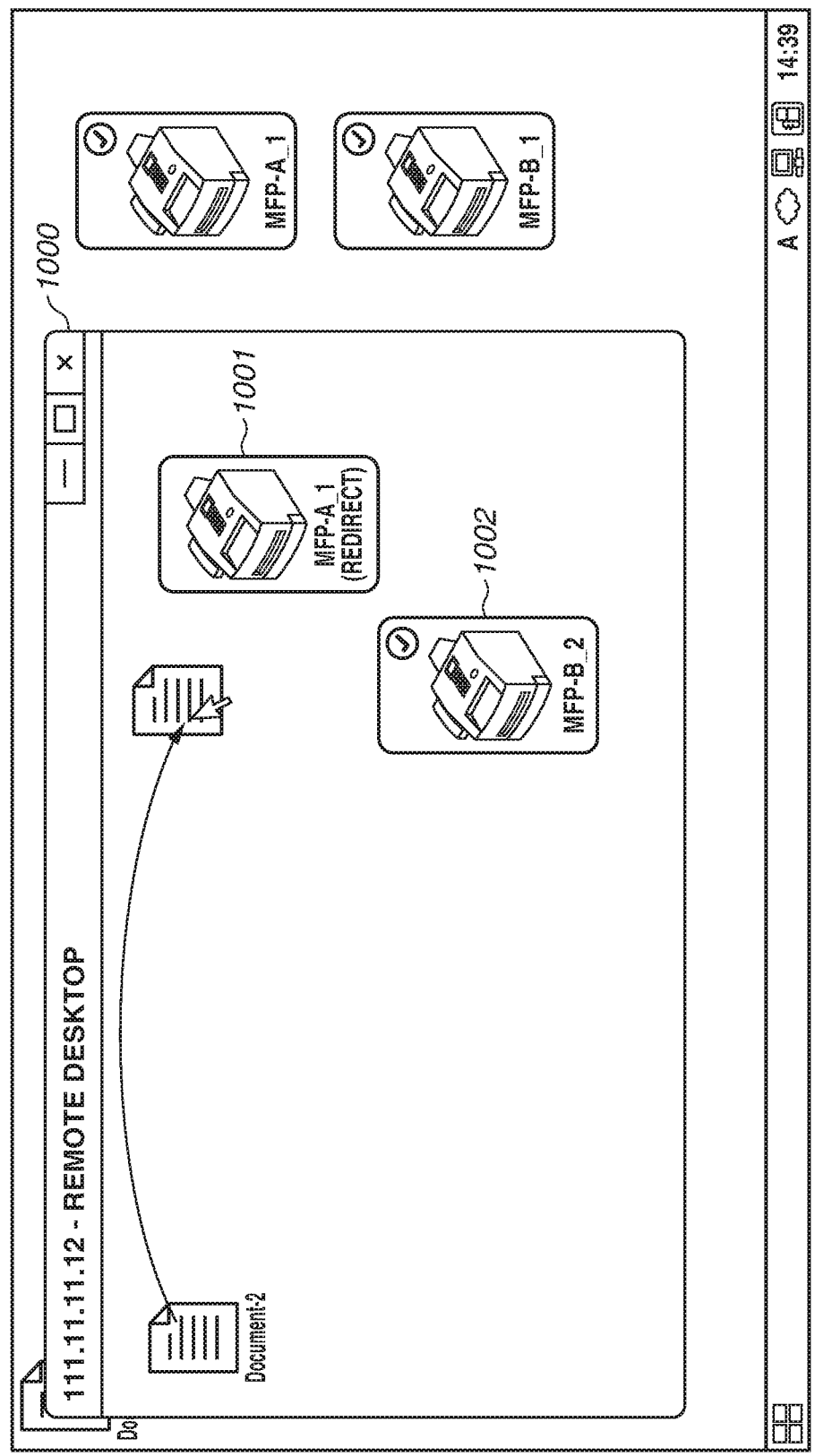
FIG. 10 illustrates a desktop screen for displaying a state where virtual devices are generated on a desktop screen of a remote connection destination.

FIG. 10 illustrates an example of a desktop screen assuming that the PC 101 is set as the remote connection source and the PC 102 is set as the remote connection destination. FIG. 10 illustrates a state where virtual devices 1001 and 1002 are generated on a desktop screen 1000 of the remote connection destination PC 102 as a result of the processing flow illustrated in FIG. 9. The virtual device 1001 indicates "MFP-A_1(Redirect)" which is managed by the remote connection source PC 101 and is allocated as a redirect printer and a redirect fax. The virtual device 1002 indicates "MFP-B_2" which is managed by the remote connection destination PC 102 and is allocated as a local printer and a local fax.

As described above, the local printer and local fax "MFP-B_2" are registered as a printer and a fax in the PC 102. Accordingly, this configuration indicates that the virtual device 1002 in which the local printer and the local fax take priority is generated in the processing illustrated in FIG. 9.

A second exemplary embodiment will be described below. The first exemplary embodiment illustrates an example of the method in which, when the PC 102 is remotely connected using the PC 101 as the remote connection source, the virtual device having the same configuration as that of the virtual device which has been used in the remote connection source PC 101 is generated in the remote connection destination PC 102 by using the configuration information about the virtual device application 300 of the remote connection source PC 101. In the first exemplary embodiment, setting information 602 and 603 about the generated virtual device are held in the virtual device application 300.

If a redirect printer or a redirect fax is allocated to the virtual device automatically generated during remote connection, the virtual device can be used because the virtual device is restored and present during remote connection when the PC 101 is remotely connected. However, if the PC 102 logs on without establishing a remote connection (this state is referred to as a local log-on), the virtual device cannot be used by the PC 102. Also, when a remote connection is established from another PC (not illustrated), the virtual device cannot be used because the virtual device is not registered in the PC.

In the present exemplary embodiment, the above-described situation is taken into consideration and the virtual device to which a redirect printer and a redirect fax are allocated is disabled when the virtual device cannot be used. The second exemplary embodiment will be described below with reference to FIGS. 11 and 12. The configuration and processing that are not particularly specified in the second exemplary embodiment are the same as those in the first exemplary embodiment.

Figure 11:
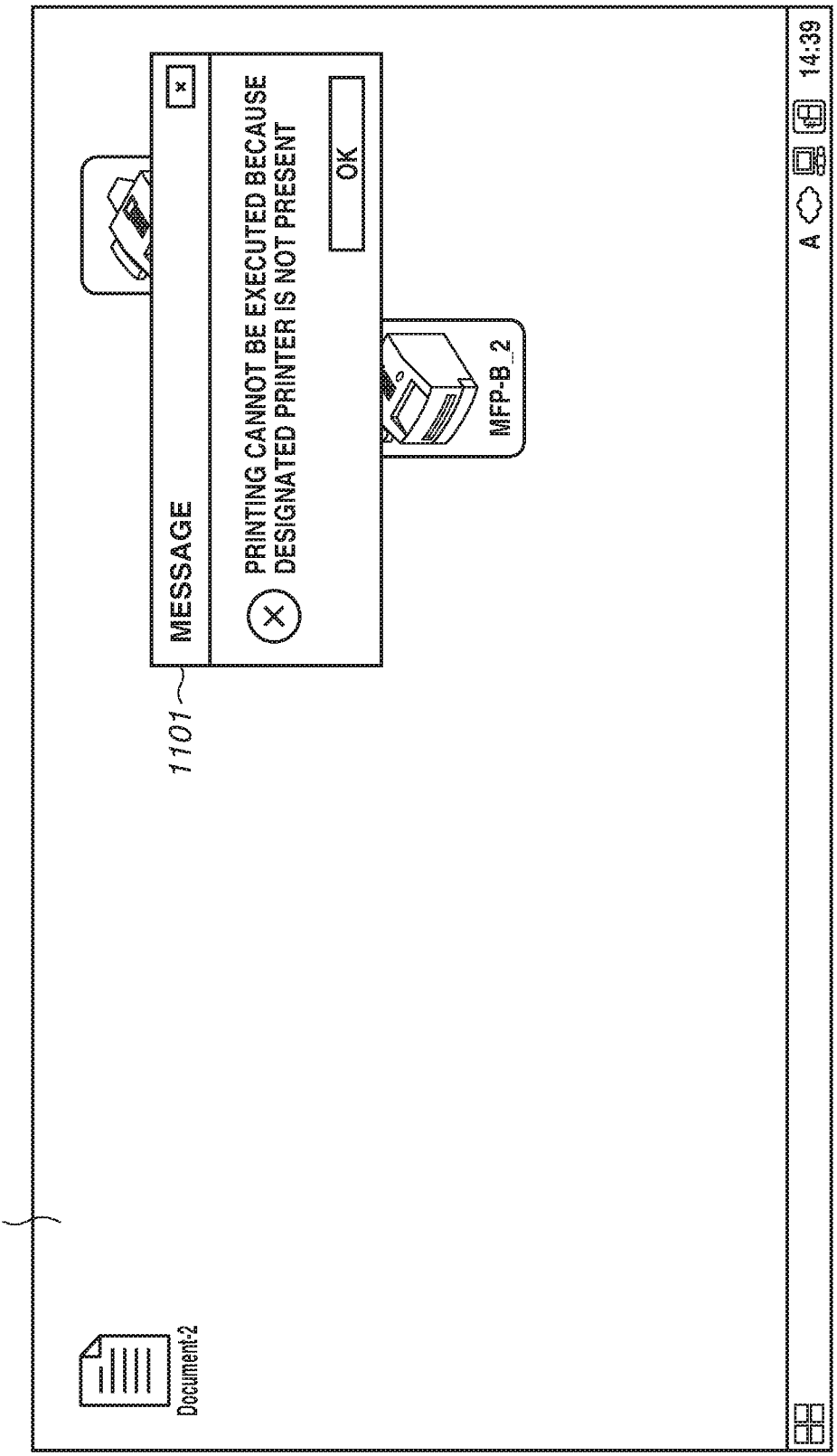
FIG. 11 illustrates a desktop screen when printing performed by a virtual device has failed.

FIG. 11 schematically illustrates a state where printing to be executed by the user using the virtual device generated by the remote connection of the PC 101 has failed when the PC 102 logs on locally.

The redirect printer 805 ("MFP-A_1") registered during the remote connection of the PC 101 is not registered in the PC 102 when the PC 102 logs on locally and is used, and thus the redirect printer 805 cannot be used for printing.

A desktop screen 1100 of the PC 102 is a desktop screen which is displayed when the PC 102 logs on locally. A message 1101 is a notification indicating that printing has failed and also indicating a state where processing has failed when the redirect printer 805 ("MFP-A_1") registered in the PC 101 is to be used.

Thus, even in a case where the virtual devices such as a redirect printer and a redirect fax, are managed by a PC, if the virtual devices are used in a PC other than the restored PC, printing and fax transmission cannot be executed. Accordingly, the user needs to be aware of whether the virtual devices can be used. If the user attempts to use the virtual devices without being aware of whether the virtual devices can be used, the printing and fax transmission may fail, which is inconvenient for the user.

Therefore, in this case, such a problem can be reduced by informing the user that the virtual devices cannot be used. The next processing flow illustrated in FIG. 12 indicates an example where, when virtual devices such as a redirect printer and a redirect fax registered in another PC are inoperative in the PC used by the user, the inoperative virtual devices are not displayed on the desktop screen.

Figure 12:
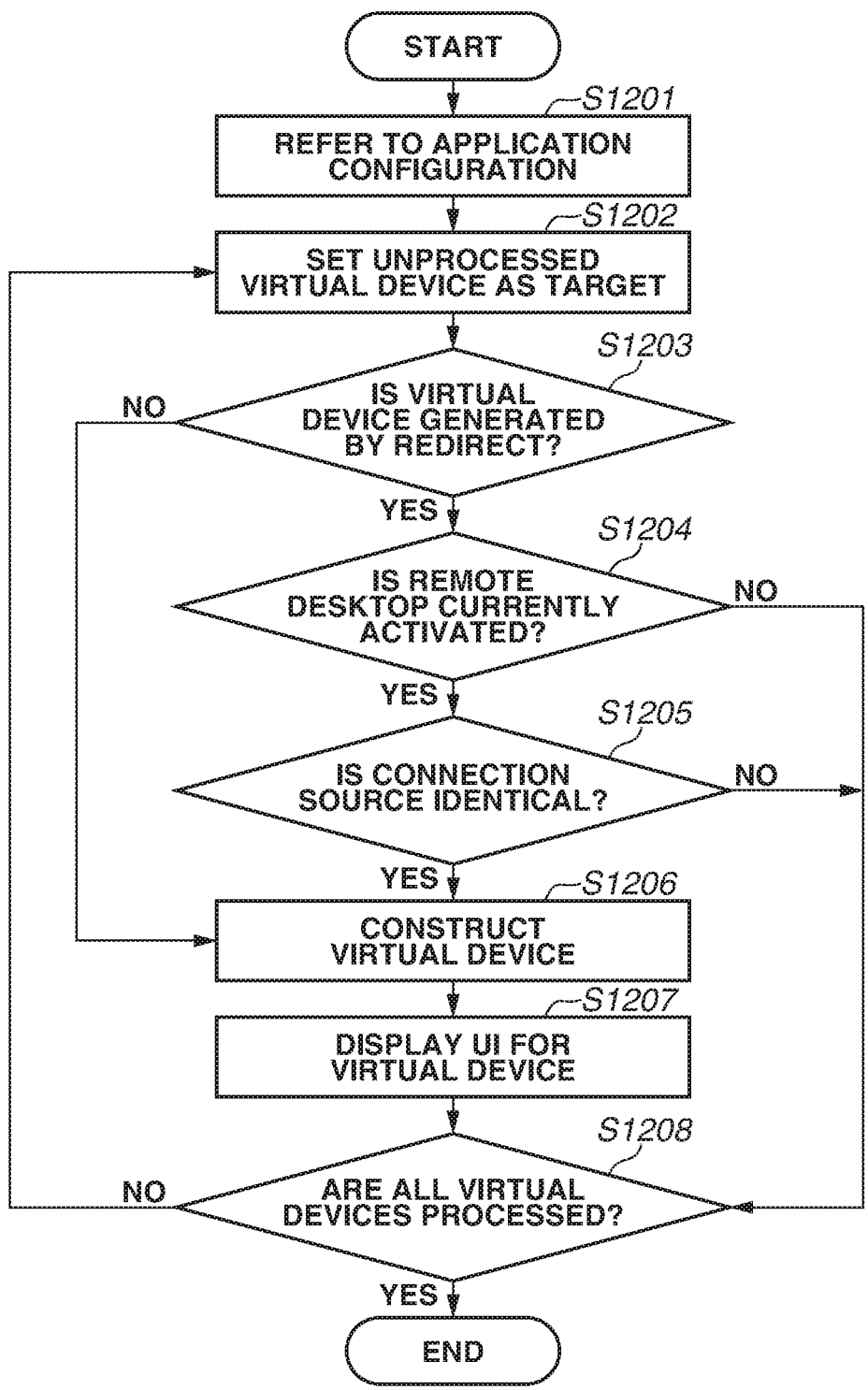
FIG. 12 illustrates a processing flow at the time of starting the virtual device application.

FIG. 12 illustrates an example of a flowchart for initialization processing that is performed to display only operative virtual devices at the time of starting the virtual device application 300.

As described above, the virtual device application 300 is a resident program. The processing is started when the virtual device application 300 is started by the OS in start-up processing (start-up) at the time of starting the OS.

In step S1201, the application configuration management unit 306 references the setting information about the virtual device application 300 recorded in the setting file 600 (see FIG. 6).

Next, in step S1202, the application configuration management unit 306 sets one virtual device 602 as a processing target out of the list 601 of virtual devices defined in the referenced setting file 600.

In step S1203, the application configuration management unit 306 refers to the redirect setting 614 about the virtual device 602 to be processed, and determines whether the virtual device is generated with a redirect printer or a redirect fax allocated thereto. If it is determined that the virtual device is generated by allocating a redirect printer or a redirect fax in step S1203 (YES in step S1203), the processing proceeds to step S1204. If it is determined that the virtual device is not generated by allocating the redirect printer or redirect fax (NO in step S1203), the processing proceeds to step S1206.

In step S1204, the application configuration management unit 306 determines whether the current log-on state is established by a remote connection through the remote connection management unit 302. If the current log-on state is not established by a remote connection (NO in step S1204), the generated virtual device cannot be used, and thus the virtual device construction processing is skipped and the processing proceeds to step S1208. If the current log-on state is established by a remote connection (YES in step S1204), the processing proceeds to step S1205 to determine whether the connection source of the remote connection is identical.

In this case, the application configuration management unit 306 sends an inquiry to the remote connection management unit 302. Further, the acquired current connection source identification information (IP address) is compared with the information about the remote connection source 615 of the virtual device referenced in step S1201, and it is determined whether these pieces of information are identical. If these pieces of information are not identical (NO in step S1205), the virtual device cannot be used, and thus the virtual device construction processing is skipped and the processing proceeds to step S1208. If these pieces of information are identical (YES in step S1205), the processing proceeds to step S1206 to determine that the virtual device is operative and the virtual device is constructed.

In step S1207, the application configuration management unit 306 reflects various setting information about the virtual device referenced in step S1201, and generates the virtual device. Then, the application configuration management unit 306 delivers the information about the virtual device generated in step S1206 to the screen display management unit 305, and displays the UI of the virtual device on the screen display management unit 305. As a result, the main UI 400 of the virtual device is displayed on the desktop of the OS.

In step S1208, the application configuration management unit 306 refers to the information about virtual device 602 referenced in step S1201, and determines whether all the defined virtual devices are processed.

If all the virtual devices are processed (YES in step S1208), the processing illustrated in the flowchart of FIG. 12 is terminated. If an unprocessed virtual device is present, the processing returns to step S1202 to execute the above-described processing again on the subsequent virtual device.

By the processing illustrated in the flowchart of FIG. 12, virtual devices such as a redirect printer and a redirect fax which cannot be used, are treated as inoperative at the time of a local log-on or a remote connection from another PC, and a notification indicating that the virtual devices are inoperative is sent to the user. This eliminates the need of the user to be aware of whether the virtual devices can be used, and prevents the user from being involved in a troublesome situation where an error occurs during execution of an operation. The present exemplary embodiment illustrates an example where an object of a virtual device is not generated and is not displayed on the desktop. However, the present disclosure is not limited to this example. For example, an icon may be displayed in such a manner that the main UI 400 of the virtual device, such as printing or fax transmission, cannot be executed, or the color or transmittance of the main UI 400 of the virtual device is changed, to display information indicating that the virtual device cannot be used on the desktop.

A third exemplary embodiment will be described below. The first exemplary embodiment illustrates an example where all virtual devices managed by the remote connection source PC 101 are generated in the PC 102, except in the case where the same virtual device is already generated in the remote connection destination PC 102. For example, in an environment in which a plurality of MFPs 103 or printers (not illustrated) is used, a large number of virtual devices may be managed by the remote connection source PC 101. The virtual devices may include those that are less frequently used. Accordingly, if all the virtual devices managed by the remote connection source PC 101 are generated by remote connection in the PC 102, which may be troublesome for the user.

In the present exemplary embodiment, the above-described situation is taken into consideration and only virtual devices that are considered to be used in the remote connection source PC 101 are generated in the remote connection destination PC 102. The third exemplary embodiment will be described below with reference to FIGS. 13 and 14. The configuration and processing that are not particularly specified in the third exemplary embodiment are the same as those in the first or second exemplary embodiment.

Figure 13:
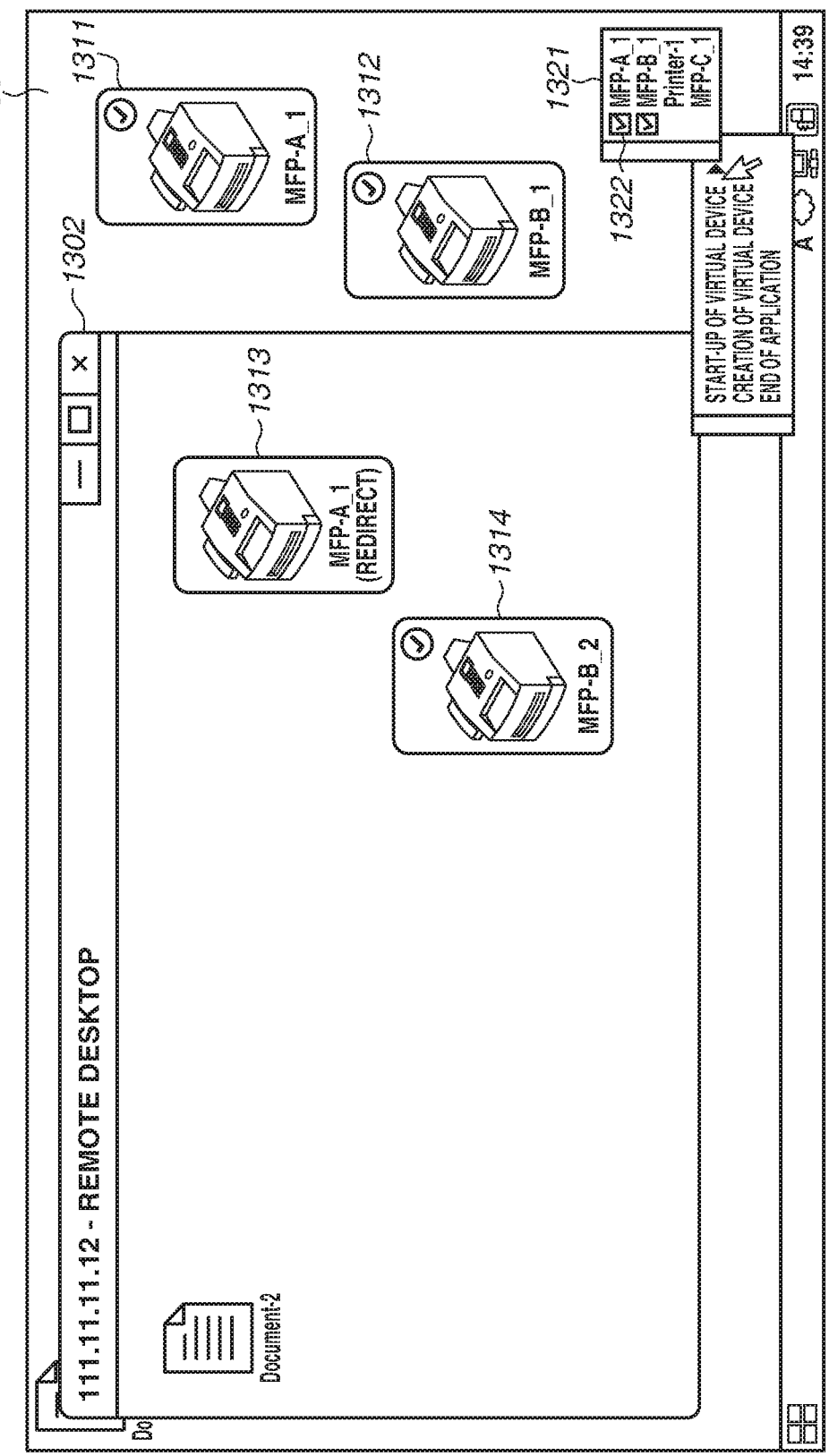
FIG. 13 illustrates a desktop screen for displaying a state where virtual devices are generated on a desktop screen of a remote connection destination.

FIG. 13 illustrates an example of a desktop screen when the PC 102 is remotely connected using the PC 101 as a remote connection source.

FIG. 13 illustrates a state where only the virtual devices being displayed on the remote connection source PC 101 are generated in the remote connection destination PC 102 by the processing illustrated in the present exemplary embodiment.

A desktop screen 1301 is a desktop screen of the remote connection source PC 101. A desktop screen 1302 of the remote connection destination PC 102 is displayed by remote connection from the PC 102.

A virtual device 1311 and a virtual device 1312 are displayed on the desktop screen 1301 of the remote connection source PC 101. The remote desktop screen 1302 of the remote connection destination PC 102 shows a state where a virtual device 1313 having the same configuration as that of the virtual device 1311 and a virtual device 1314 having the same configuration as that of the virtual device 1312 are generated by remote connection.

A menu 1321 is a menu for displaying virtual devices, and a check mark 1322 indicates virtual devices that are currently displayed. Four virtual devices are managed in the virtual device application of the remote connection source PC 101, and the two virtual devices 1311 and 1312 out of the four virtual devices are displayed. The desktop screen 1302 of the remote connection destination PC 102 shows a state where the virtual devices that are not displayed on the remote connection source PC 101 are not generated.

Figure 14:
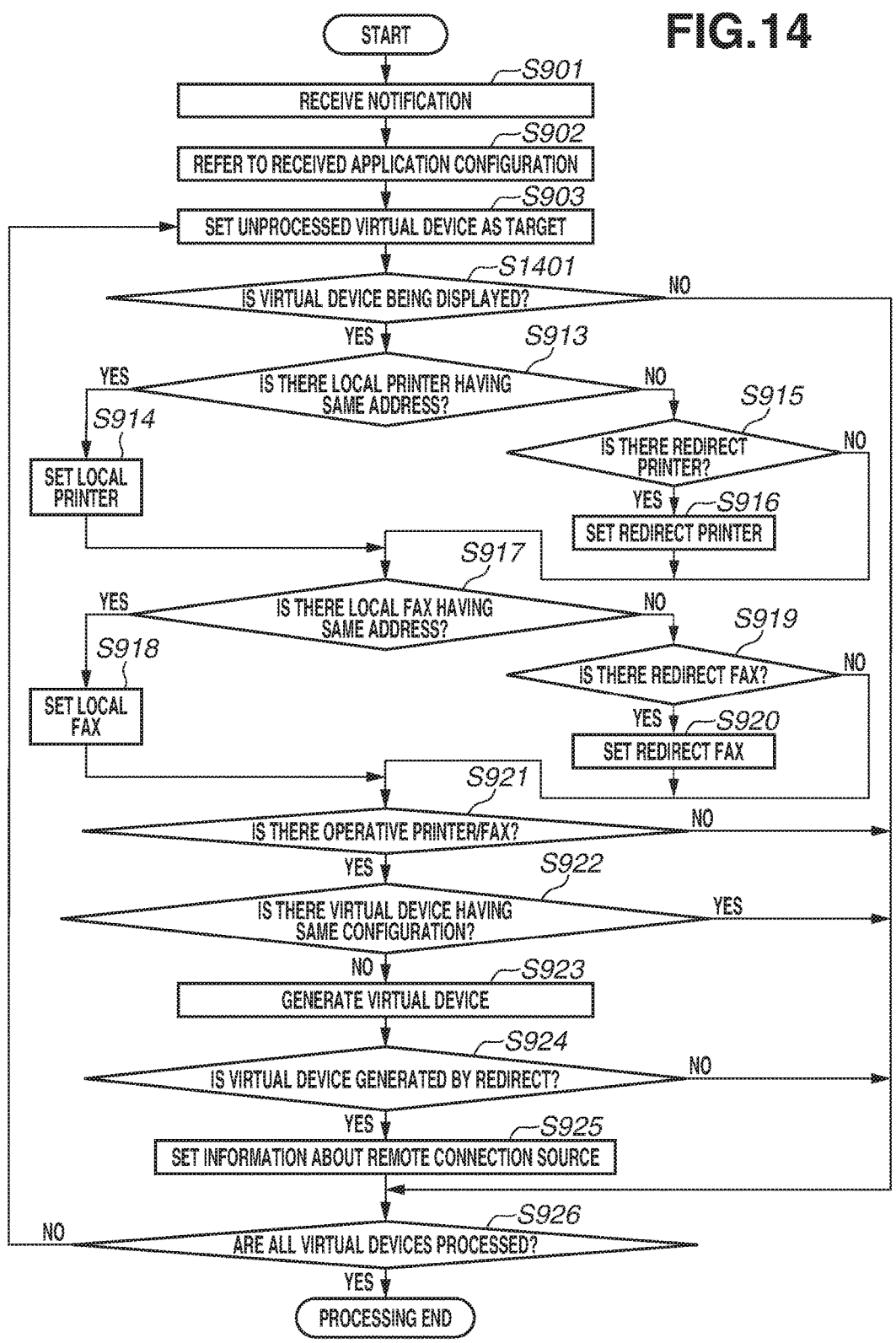
FIG. 14 illustrates a flowchart for generating a virtual device.

FIG. 14 illustrates an example of a flowchart for processing in which the virtual device having the same configuration as that of the virtual device which has been used in the remote connection source PC 101 during the remote connection is automatically created in the remote connection destination PC 102.

FIG. 14 illustrates processing for generating only the virtual devices being displayed from among the virtual devices managed by the virtual device application 300 of the remote connection source PC 101. A basic processing flow illustrated in FIG. 14 is the same as the processing illustrated in FIG. 9 according to the first exemplary embodiment, and thus processing different from the processing of the first exemplary embodiment is mainly described.

The application configuration management unit 306 receives a notification from the remote connection source in step S901, refers to the configuration information about the virtual device application 300 received by the notification in step S902, and sets one of the virtual devices as a processing target in step S903.

Next, in step S1401, the application configuration management unit 306 refers to the virtual device display setting 611 and determines whether the virtual device is being displayed on the desktop screen of the remote connection source PC 101. In other words, it is determined whether the virtual device is being generated in the PC 101.

If it is determined that the virtual device is not being displayed (NO in step S1401), the virtual device generation processing is skipped and the processing proceeds to step S926. If the virtual device is being displayed (YES in step S1401), the processing proceeds to step S913 to execute the virtual device generation processing.

By the processing illustrated in FIG. 14, only the virtual device being displayed is generated in the PC 102 by the virtual device application 300 of the remote connection source PC 101 during the remote connection. Thus, only the virtual devices that are frequently used are reflected in the remote connection destination PC 102, thereby preventing the user from being involved in a troublesome situation where virtual devices that are less frequently used are generated. In addition, a setting may be made such that switching between the execution of the processing illustrated in the third exemplary embodiment and the execution of the processing illustrated in the first exemplary embodiment can be accomplished.

A fourth exemplary embodiment will be described below. In the exemplary embodiments described above, when the virtual device used in the remote connection source PC 101 is reflected in the remote connection destination PC 102, the difference between the functions of the virtual device used in the PC 101 and the functions of the virtual device used in the PC 102 is not particularly mentioned. However, there may be a difference between the functions of the virtual device used in the PC 101 and the functions of the virtual device used in the PC 102.

Specifically, information that can be acquired when a redirect printer and a redirect fax are used, may be more limited than that acquired when a local printer and a local fax are used. For example, it is difficult to perform address resolution and the IP address of the MFP 103 cannot be specified. In this case, the function for monitoring a device status or a job status cannot be used. When the PDF storage destination path 610 set in the virtual device indicates a local desktop, the same path is not present in the remote connection destination, and thus it is highly likely that the storage destination cannot be used. In the exemplary embodiments described above, the difference between the functions is not taken into consideration. Accordingly, if the user is not aware of the difference between the functions, there is a possibility that the user cannot use some of the functions.

In the present exemplary embodiment, the above-described situation is taken into consideration, and when there is a difference between the functions, a notification indicating details of the difference is sent to the user. The fourth exemplary embodiment will be described below with reference to FIGS. 15 to 17. The configuration and processing that are not particularly specified in the fourth exemplary embodiment are the same as those in the first to third exemplary embodiments.

Figure 15:
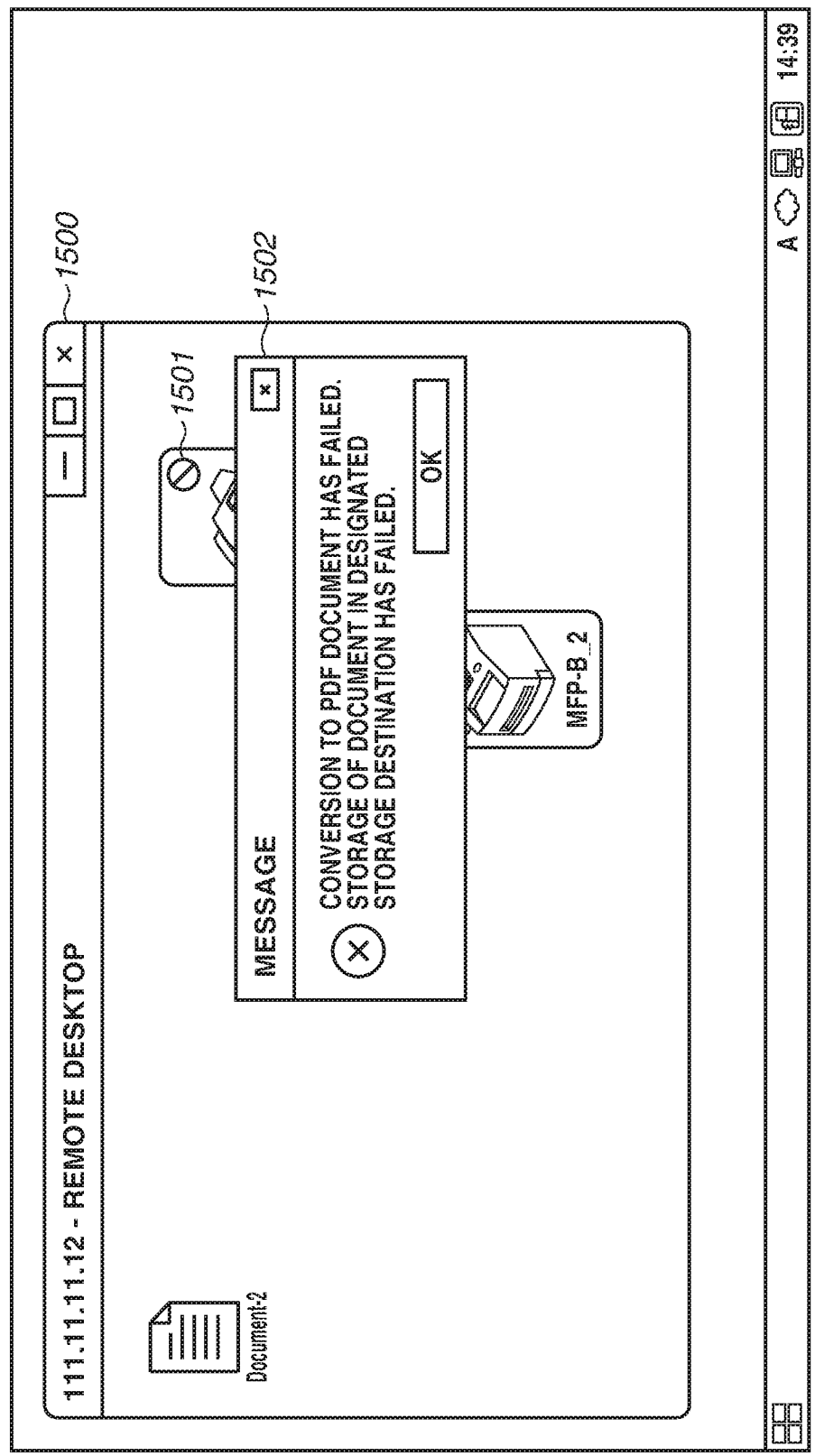
FIG. 15 illustrates a desktop screen for displaying a state where a portable document format (PDF) conversion performed by the virtual device has failed.

FIG. 15 illustrates an example of a desktop screen when the PC 102 is remotely connected using the PC 101 as the remote connection source.

A desktop screen 1500 is a desktop screen of the remote connection destination PC 102. A status icon 1501 indicates the status of a redirect printer and a redirect fax as virtual devices managed by the PC 102. FIG. 15 shows that the virtual devices cannot be monitored. An error message 1502 indicates that a PDF conversion has failed in FIG. 15.

In this case, a device status monitoring setting and a job status monitoring setting for the virtual device are operative. However, since a redirect printer is set as the virtual device, monitoring cannot be executed. Accordingly, the icon 1501 indicating that monitoring cannot be executed is displayed. Further, since a setting of the PDF conversion storage destination of the remote connection source PC 101 is designated on the local disk of the PC 101, when the PDF conversion is executed, the error message 1502 indicating that the file cannot be stored in the storage destination is displayed.

Figure 16:
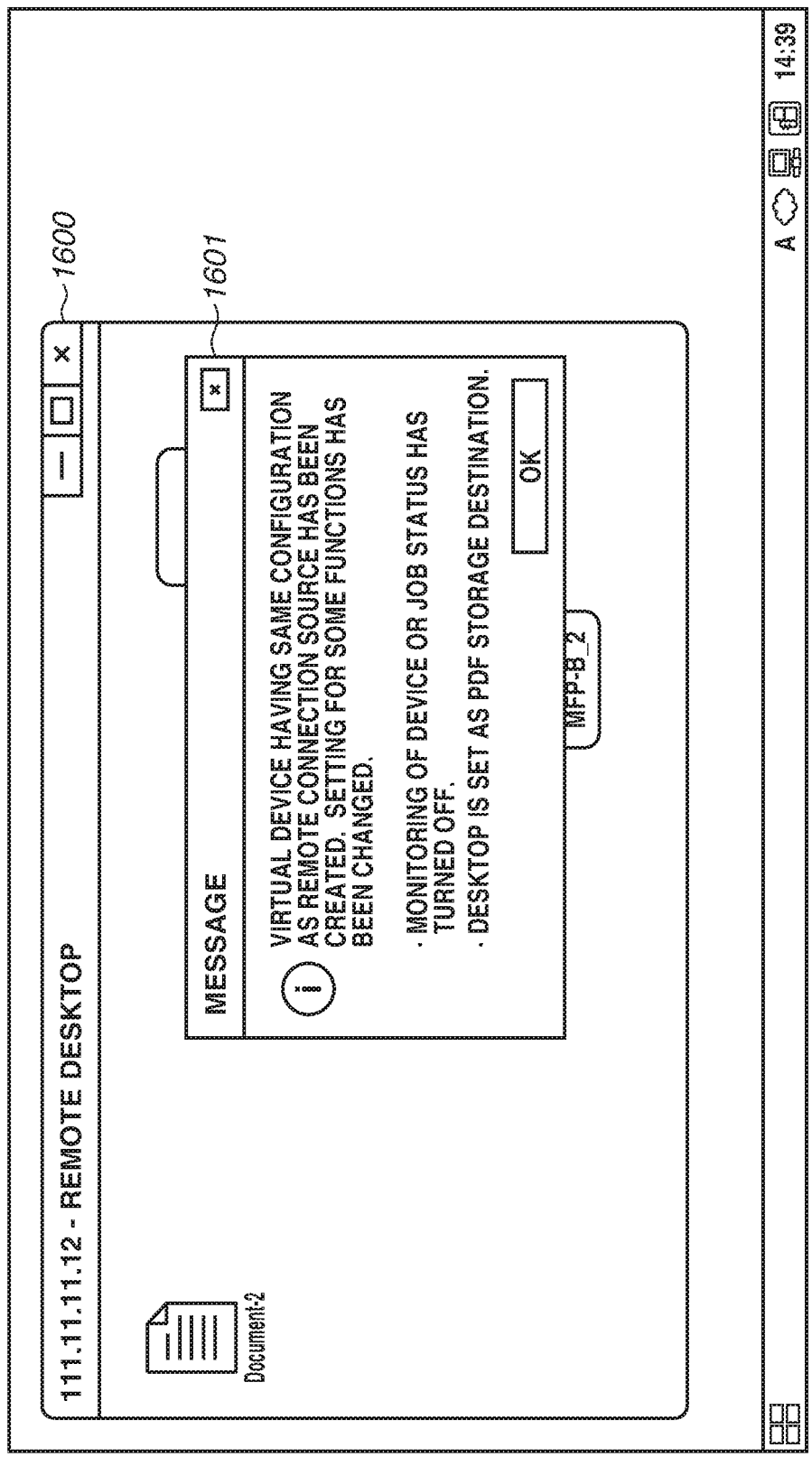
FIG. 16 illustrates a desktop screen for displaying a state where setting change of the virtual device is notified.
Figure 17:
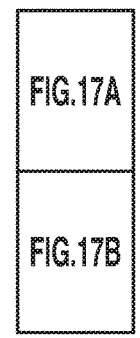
FIG. 17A and FIG. 17B illustrate flowcharts for generating the virtual device.
Figure 17A:
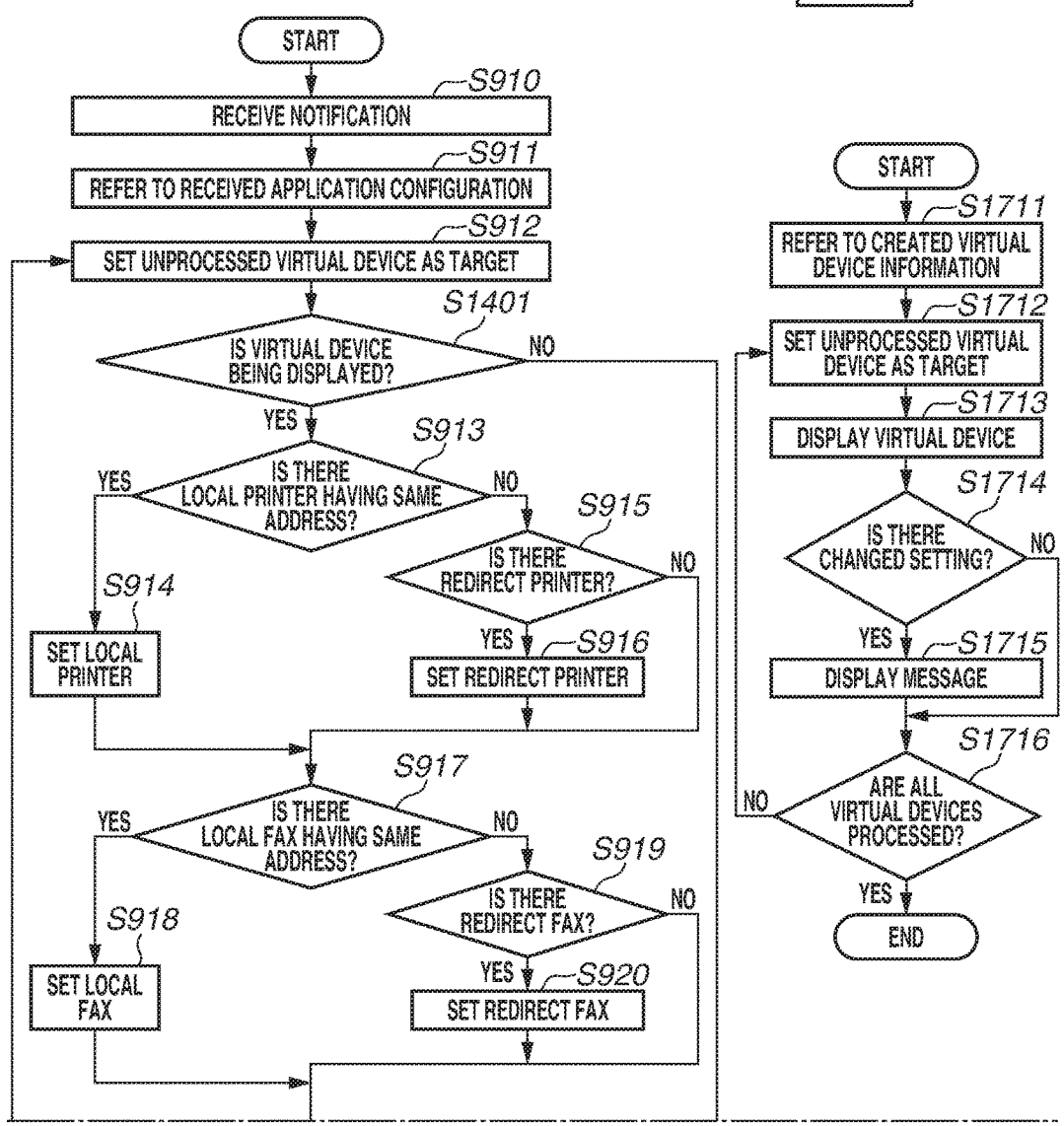
Figure 17B:
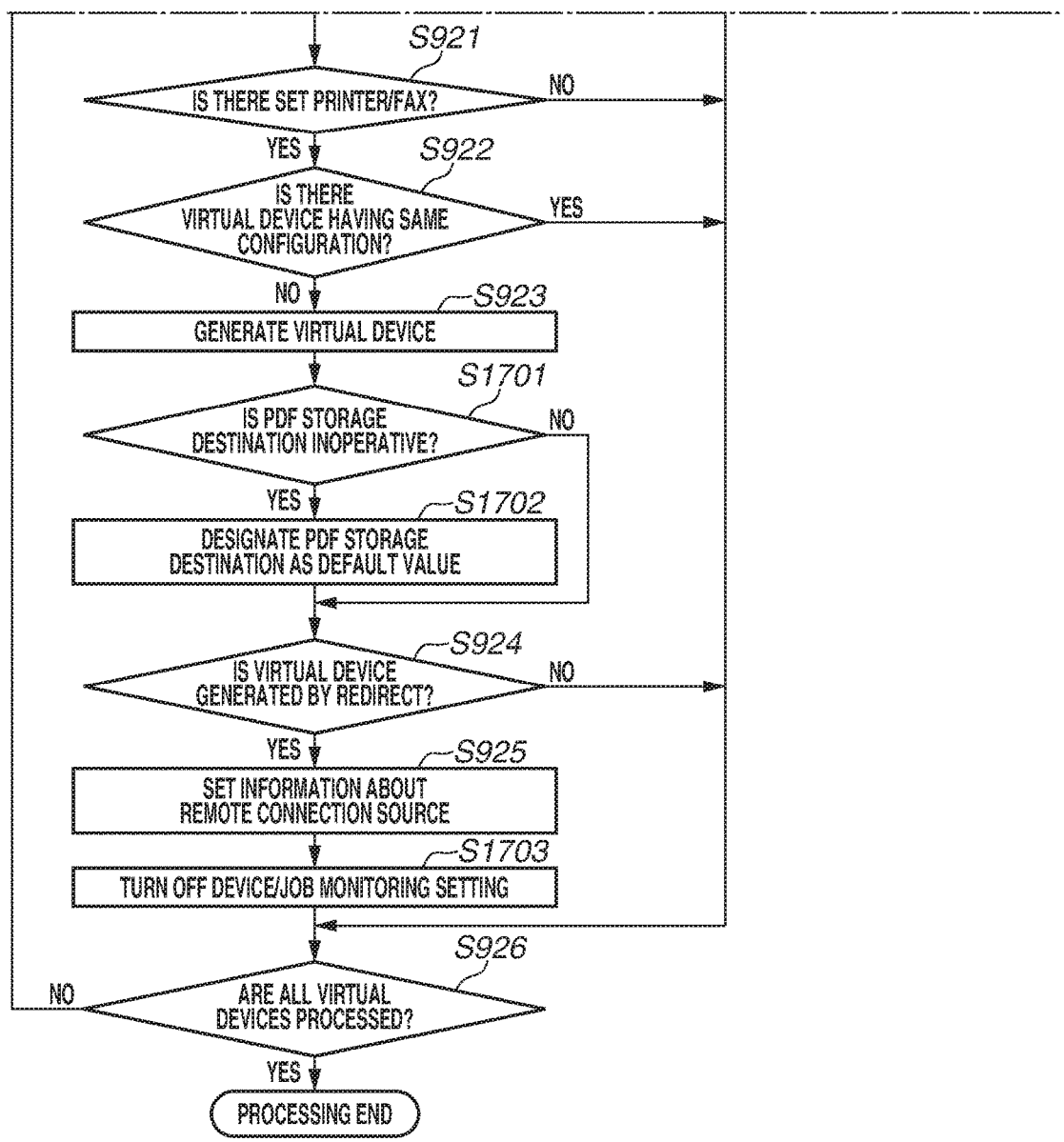

In examples illustrated in FIGS. 16 and 17, when the functions are limited as described above, the setting is changed and a notification indicating that the setting is changed is sent to the user. This enables the user to use the virtual device generated in the remote connection destination PC 102 after recognizing that some functions cannot be used.

FIG. 16 illustrates an example of a desktop screen when the PC 102 is remotely connected using the PC 101 as the remote connection source. As for the functions that cannot be used as illustrated in FIG. 15, the functions are detected during the virtual device generation processing illustrated in FIG. 17, and a message indicating the detected matter is displayed during the virtual device display processing. A desktop screen 1600 is a screen of the remote connection destination PC 102. A message 1601 is a notification indicating that the setting is turned off because the device status and job status monitoring functions cannot be used, and the setting is changed to a default setting (on the desktop) because an inoperative path is designated in the PDF conversion storage destination.

FIG. 17 illustrates an example of a flowchart for processing which automatically creates the virtual device having the same configuration as that of the virtual device used in the remote connection source PC 101 in the remote connection destination PC 102 at the time of remote connection.

In the present exemplary embodiment, it is determined whether there is a function that cannot be used at the time of generation of a virtual device in the remote connection destination PC 102. If there is a function that cannot be used, the virtual device is generated after changing the setting, and then a message indicating the changed matter is displayed. A basic processing flow illustrated in FIG. 17 is the same as the processing illustrated in FIG. 9 according to the first exemplary embodiment and the processing illustrated in FIG. 14 according to the third exemplary embodiment, and thus processing different from the processing of the first exemplary embodiment is mainly described.

In step S923, the application configuration management unit 306 defines the configuration information about the virtual device by reflecting values included in the configuration information about the printer and fax allocated by the previous processing, and values other than the allocated printer and fax, included in the configuration information about the virtual device received by the notification from the connection source as setting information.

Next, in step S1701, the application configuration management unit 306 refers to the generated configuration information about the virtual device and determines whether the PDF storage destination path 610 is operative. Specifically, it is confirmed whether a folder designated by the PDF storage destination path 610 is present. For example, when a shared folder is designated and the shared folder can be referenced from the remote connection destination PC 102, the shared folder can be used as it is. However, when a path is designated on the local disk of the remote connection source C101, the path cannot be used, unless an accidental coincidence occurs. If it is determined that the path is operative (NO in step S1701), the PDF storage destination path 610 is used as it is and the processing proceeds to step S924. If it is determined that the path is inoperative (YES in step S1701), the processing proceeds to step S1702.

In step S1702, the application configuration management unit 306 changes the setting value for the PDF storage destination path 610 to a default path (e.g., a path on the desktop of the PC 102). Further, flag information indicating that the setting for the PDF storage destination path 610 has been changed is set and then the processing proceeds to step S924.

In step S924, if it is determined that a redirect printer or a redirect fax is allocated to the virtual device (YES in step S924), the processing proceeds to step S925 and the application configuration management unit 306 set the information about the remote connection source and then the processing proceeds to step S1703.

In step S1703, the application configuration management unit 306 refers to the device status display setting 608 and the job monitoring setting 609 for the configuration information about the virtual device. If these settings are operative (true), the values are set to inoperative (false) and flag information indicating that the settings have been changed is set, and then the processing proceeds to step S926.

Steps S1711 to S1716 are processing for displaying the generated virtual device after execution of the virtual device generation processing.

In step S1711, the application configuration management unit 306 refers to the configuration information about the virtual devices generated by the virtual device generation processing (see FIGS. 9, 13, and 17). In step S1712, one of the virtual devices is set as a processing target.

In step S1713, the application configuration management unit 306 delivers the configuration information about the virtual device to the screen display management unit 305 to instruct the screen display management unit 305 to display the virtual device. The screen display management unit 305 displays the main UI 400 of the virtual device on the desktop of the remote connection destination PC 102 based on the received configuration information about the virtual device.

In step S1714, the application configuration management unit 306 refers to the flag information (step S1703) indicating whether the setting designated in the virtual device generation processing has been changed, and determines whether there is a changed setting.

If there is no changed setting (NO in step S1714), the processing proceeds to step S1716. If there is a changed setting (YES in step S1714), the processing proceeds to step S1715 and the application configuration management unit 306 sends an instruction to the screen display management unit 305 to display a message notifying that the setting has been changed. The message notifies the details of the changed setting with reference to the flag information described above.

In step S1716, the application configuration management unit 306 refers to the configuration information about the virtual device of the connection source received in step S910, and determines whether all the virtual devices are processed. If an unprocessed virtual device is present (NO in step S926), the processing returns to step S1712 to execute the above-described processing on the unprocessed virtual device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-222397, filed Nov. 20, 2017, which is hereby incorporated by reference herein in its entirety.

What is claimed is:

1. An information processing apparatus capable of managing an object to which a print queue for instructing execution of processing on an image processing apparatus is allocated, the information processing apparatus comprising:
   one or more processors; and
   one or more memory devices storing instructions that, when executed by the one or more processors configures the information processing apparatus to:
   receive configuration information about an object managed by another information processing apparatus different from the information processing apparatus in a case where a remote desktop connection is established which enables displaying, on a display of the another information processing apparatus, a window for displaying a desktop screen of the information processing apparatus;
   determine, based on the received configuration information, whether an image processing apparatus corresponding to a print queue allocated to the object managed by the another information processing apparatus is identical with an image processing apparatus corresponding to a print queue registered in the information processing apparatus; and
   apply a setting that allocates the print queue registered in the information processing apparatus to an object to be displayed on the information processing apparatus in a case where it is determined that the image processing apparatuses are identical with each other,
   wherein the object for which the setting is applied is displayed to instruct execution of processing on the image processing apparatus corresponding to the print queue, by using the print queue.

2. The information processing apparatus according to claim 1, wherein execution of the instructions by the one or more processors further causes the information processing apparatus to, in a case where it is determined that the image processing apparatuses are not identical, apply a setting that remotely allocates a print queue allocated to an object displayed on the another information processing apparatus to the object to be displayed on the information processing apparatus.

3. The information processing apparatus according to claim 2, wherein the setting for remotely allocating the print queue is a setting for generating a redirect queue corresponding to a print queue and allocating the print queue corresponding to the generated redirect queue to the object to be displayed on the information processing apparatus.

4. The information processing apparatus according to claim 1, wherein the image processing apparatus includes at least one of a print function and a facsimile (fax) function and is communicably connected to each of the information processing apparatus and the another information processing apparatus.

5. The information processing apparatus according to claim 1, wherein
   the received configuration information about the object and managed in the other information processing apparatus includes information about a display setting for the object, and
   only the object for which the display setting is made based on the display setting in the another information processing apparatus is displayed as the object to be displayed on the information processing apparatus.

6. The information processing apparatus according to claim 1, wherein in a case where there is a difference between usable functions of the object managed in the another information processing apparatus and usable functions of the object to be displayed on the information processing apparatus, information about the difference is displayed.

7. The information processing apparatus according to claim 1,
   wherein the configuration information includes at least a name and an address of the image processing apparatus managed in the another information processing apparatus,
   wherein execution of the instructions by the one or more processors further causes the information processing apparatus to, determine whether the address included in the configuration information matches an address of the image processing apparatus managed in the information processing apparatus,
   wherein, in a case where the two addresses match each other, make a setting for allocating the image processing apparatus identified by the address included in the configuration information to the object, and
   wherein, in a case where the two addresses do not match each other, if the name included in the configuration information contains a specific character string, allocate the image processing apparatus identified by the specific character string to the object.

8. A control method for an information processing apparatus capable of managing an object to which a print queue for instructing execution of processing on an image processing apparatus, the control method comprising:
   receiving configuration information about an object managed by another information processing apparatus different from the information processing apparatus in a case where a remote desktop connection is established which enables displaying, on a display unit of the another information processing apparatus, a window for displaying a desktop screen of the information processing apparatus;
   determining, based on the received configuration information, whether an image processing apparatus corresponding to a print queue allocated to the object managed by the another information processing apparatus is identical with an image processing apparatus corresponding to a print queue registered in the information processing apparatus; and making a setting that allocates the print queue registered in the information processing apparatus to an object to be displayed on the information processing apparatus in a case where the determination unit determines that the image processing apparatuses are identical with each other, wherein the object for which the setting is applied is displayed to instruct execution of processing on the image processing apparatus corresponding to the print queue by using the print queue.

9. A non-transitory storage medium storing instructions to be executed by one or more processors and which causes a an information processing apparatus capable of managing an object to which a print queue for instructing execution of processing on an image processing apparatus to execute a control method, the control method comprising:

receiving configuration information about an object managed by another information processing apparatus different from the information processing apparatus in a case where a remote desktop connection is established which enables displaying, on a display unit of the another information processing apparatus, a window for displaying a desktop screen of the information processing apparatus;

determining, based on the received configuration information, whether an image processing apparatus corresponding to a print queue allocated to the object managed by the another information processing apparatus is identical with an image processing apparatus corresponding to a print queue registered in the information processing apparatus; and making a setting for allocating the print queue registered in the information processing apparatus to an object to be displayed on the information processing apparatus in a case where the determination unit determines that the image processing apparatuses are identical with each other, wherein the object for which the setting is made is displayed to instruct execution of processing on the image processing apparatus corresponding to the print queue by using the print queue.

* * * * *